(12) United States Patent
Mizobuchi et al.

(10) Patent No.: US 6,907,860 B2
(45) Date of Patent: Jun. 21, 2005

(54) CONTROL APPARATUS AND CONTROL METHOD FOR VEHICLE-MOUNTED INTERNAL COMBUSTION ENGINE

(75) Inventors: Masayasu Mizobuchi, Aichi-ken (JP); Atsushi Ayabe, Toyota (JP); Toshio Sugimura, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/865,814

(22) Filed: Jun. 14, 2004

(65) Prior Publication Data

US 2004/0250792 A1 Dec. 16, 2004

(30) Foreign Application Priority Data

Jun. 12, 2003 (JP) ........................................ 2003-168085

(51) Int. Cl.⁷ ............................................... F02D 13/04
(52) U.S. Cl. ...................... 123/322; 123/320; 123/321; 123/333
(58) Field of Search ................................. 123/322, 320, 123/321, 325, 332, 333, 395

(56) References Cited

U.S. PATENT DOCUMENTS 6,857,491 B2 * 2/2005 Wakashiro et al. ........ 180/65.2

FOREIGN PATENT DOCUMENTS

JP       5-162570       6/1993

OTHER PUBLICATIONS

A. Ayabe, et al., Japan Institute of Invention and Innovation, Journal No. 2002–3784, 1 page, "Control Apparatus for Vehicle Having Engine and Automatic Transmission", Sep. 2, 2002 (with English translation).

* cited by examiner

*Primary Examiner*—Bibhu Mohanty
(74) *Attorney, Agent, or Firm*—Oblon, Spivak, McClelland, Maier & Neustadt, P.C.

(57) ABSTRACT

A vehicle-mounted internal combustion engine has a variable lift mechanism for varying the valve lift of an intake valve. During deceleration of the vehicle, an ECU performs fuel cutoff control for temporarily stopping supply of fuel to the engine. During the fuel cutoff control, the ECU performs throttle opening increase control as necessary to set the opening degree of a throttle valve greater than a usual target opening degree that is set when an acceleration pedal is not depressed. If the throttle opening increase control is being performed when resumption of the fuel supply is required during the fuel cutoff control, the ECU controls the variable lift mechanism such that the valve lift is reduced compared to a situation where the throttle opening increase control is not being performed.

18 Claims, 17 Drawing Sheets

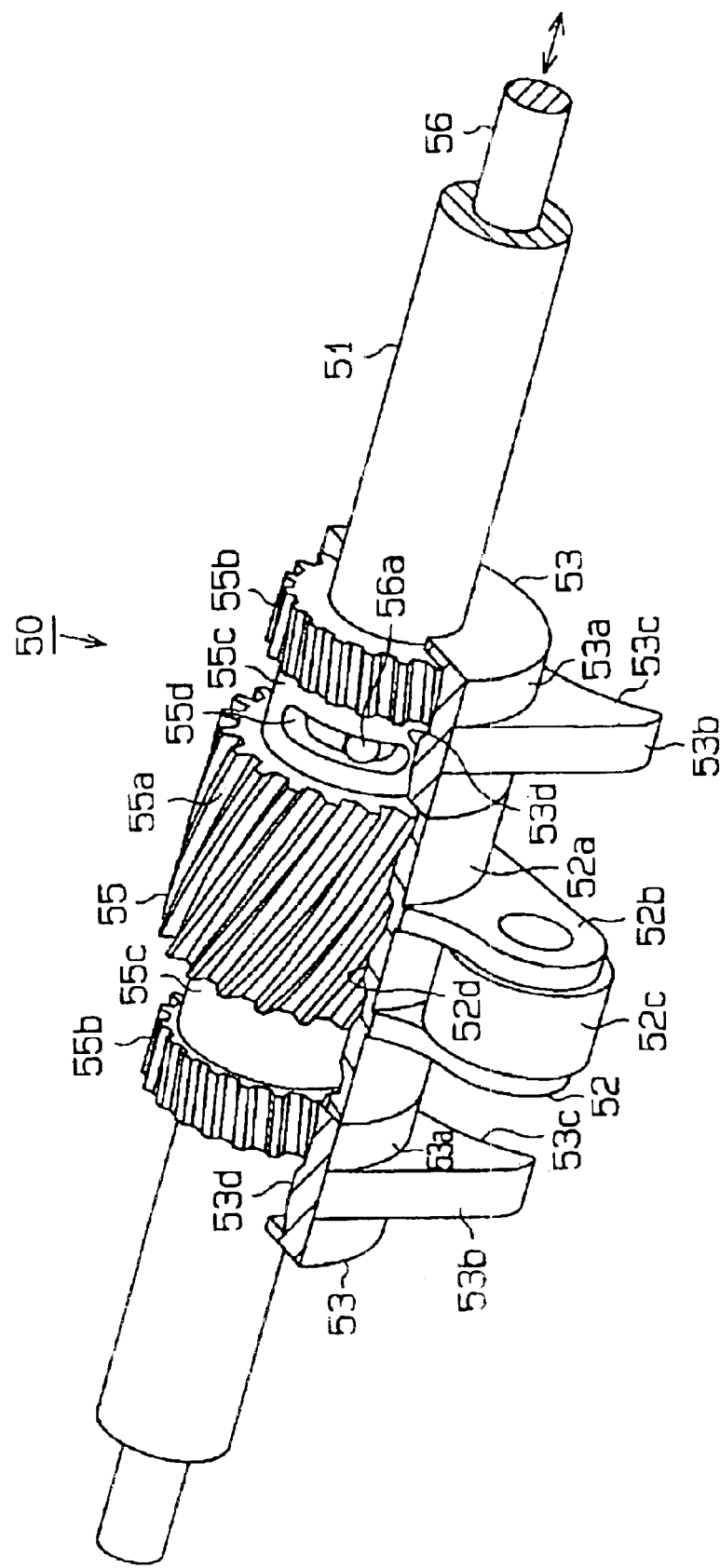

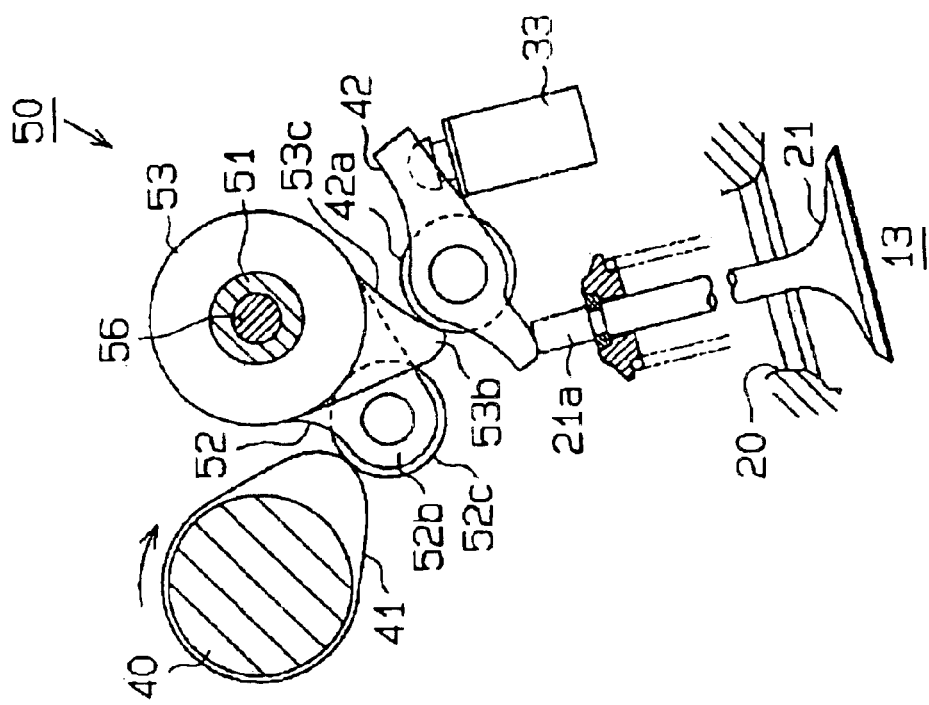
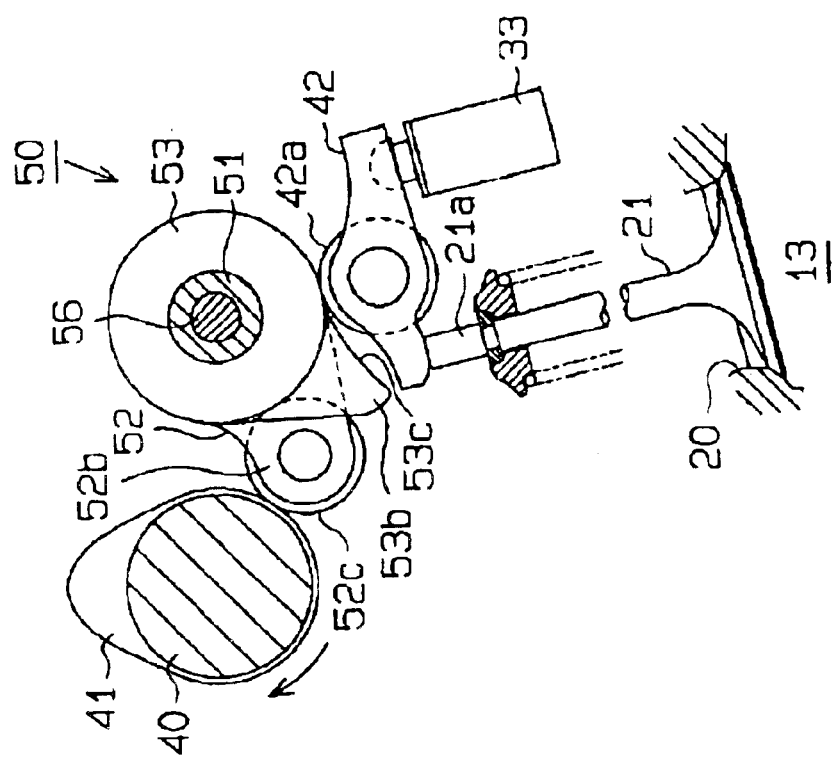

US 6,907,860 B2

CONTROL APPARATUS AND CONTROL METHOD FOR VEHICLE-MOUNTED INTERNAL COMBUSTION ENGINE

BACKGROUND OF THE INVENTION

The present invention relates to a control apparatus and a control method for vehicle-mounted internal combustion engines, and more particularly to improvement of drivability when the control of the engine is shifted from a fuel cutoff control, which is performed during deceleration of the vehicle, to resumption of fuel supply.

As is well known, in many a vehicle-mounted internal combustion engine, a fuel cutoff control, which means a temporary suspension of fuel supply to the internal combustion engine at the time of deceleration of the vehicle speed, is performed with a view to improving the engine's fuel efficiency. According to a technique disclosed in Hatsumei Kyokai (Japan Institute of Invention and Innovation), Report on Published Techniques (in Japanese), No. 2002-3784, during a fuel cutoff control, the opening degree of a throttle valve (throttle opening degree) is controlled to be greater than the usual target opening degree when the accelerator pedal is not depressed (throttle opening increase control). This is intended to reduce the compressive reaction force and thereby to reduce the engine braking force due to pumping. As a result, the degree of deceleration of the vehicle is appropriately controlled, and the shock due to the down shifting of the transmission is suppressed.

However, execution of the throttle opening increase control during a fuel cutoff control involves the risk of the following trouble. Thus, when the opening degree of the throttle valve is varied, the corresponding variation air flow lags behind. Consequently, when a fuel cutoff control is discontinued to resume fuel supply during the throttle opening increase control, even if the throttle opening degree is controlled in the closing direction simultaneously with the resumption of fuel supply, a greater quantity of air than is appropriate will be let into the cylinders immediately after the resumption of fuel supply. As a result, the engine will generate a greater running power immediately after the resumption of fuel supply than is intended by the driver, inviting troubles such as deteriorated drivability. On the other hand, if resumption of fuel supply is delayed until the quantity of air let into the cylinders becomes stabilized to prevent these troubles, the responsiveness of the running power will be correspondingly affected, again inviting deteriorated drivability.

SUMMARY OF THE INVENTION

An object of the present invention is to ensure satisfactory behavior of the engine at the time of resumption of fuel supply from a fuel cutoff control involving a throttle opening increase control.

To achieve the above object, the present invention provides a control apparatus for a vehicle-mounted internal combustion engine. The engine has a variable lift mechanism for varying the valve lift of an intake valve. During deceleration of the vehicle, the control apparatus performs fuel cutoff control for temporarily stopping supply of fuel to the engine. During the fuel cutoff control, the control apparatus performs throttle opening increase control as necessary to set the opening degree of a throttle valve greater than a usual target opening degree that is set when an acceleration pedal is not depressed. If the throttle opening increase control is being performed when resumption of the fuel supply is required during the fuel cutoff control, the control apparatus controls the variable lift mechanism such that the valve lift is reduced compared to a situation where the throttle opening increase control is not being performed.

The present invention also provides a control method for a vehicle-mounted internal combustion engine. The engine has a variable lift mechanism for varying the valve lift of an intake valve. The method includes: during deceleration of the vehicle, performing fuel cutoff control for temporarily stopping supply of fuel to the engine; during the fuel cutoff control, performing throttle opening increase control as necessary to set the opening degree of a throttle valve greater than a usual target opening degree that is set when an acceleration pedal is not depressed; and if the throttle opening increase control is being performed when resumption of the fuel supply is required during the fuel cutoff control, controlling the variable lift mechanism such that the valve lift is reduced compared to a situation where the throttle opening increase control is not being performed.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a perspective view, with a part cut away, illustrating the variable lift mechanism shown in FIG. 2;

FIG. 4(A) and FIG. 4(B) are diagrams illustrating actions of the variable lift mechanism when the valve lift is increased;

DETAILED DESCRIPTION OF THE PREFERRED EMBODIMENTS

A first embodiment of the present invention will be described in detail below with reference to accompanying drawings.

Figure 1:
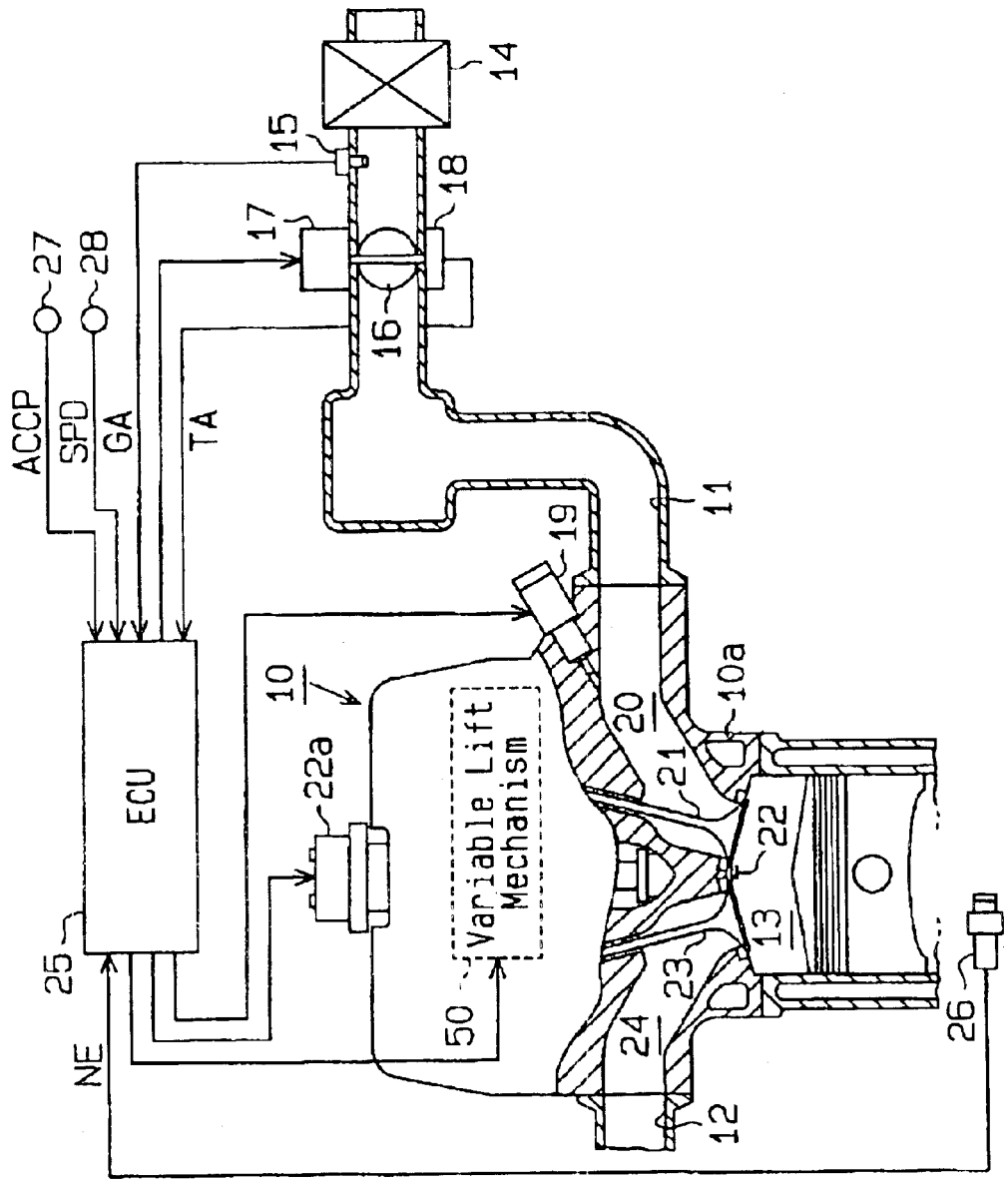
FIG. 1 is a schematic diagram illustrating an internal combustion engine and a control system therefor according to a first embodiment of the invention.

As shown in FIG. 1, a vehicle-mounted internal combustion engine 10 according to the embodiment is provided with an intake passage 11, an exhaust passage 12 and a combustion chamber 13. Although the following description refers to an application of the invention to a port injection type vehicle-mounted internal combustion engine in which fuel is injected to the intake port 20 of the internal combustion engine 10, the invention may as well be applied to a cylinder injection type vehicle-mounted internal combustion engine in which fuel is injected directly into the combustion chamber 13.

In the intake passage 11 of the internal combustion engine 10 are arranged an air cleaner 14 for cleaning the air, an air flow meter 15 for detecting the air flow rate in the intake passage 11, i.e. the intake air flow rate GA, and a throttle valve 16 for adjusting the intake air flow rate GA by varying the area of air passage within the intake passage 11. The valve shaft of the throttle valve 16 is drive-linked to a throttle motor 17. In the vicinity of the throttle valve 16 is arranged a throttle sensor 18 for detecting the opening degree of the throttle valve 16, i.e. the throttle opening degree TA.

Downstream from the throttle valve 16, the intake passage 11 is connected to the combustion chamber 13 via the intake port 20 formed in the cylinder head 10a of the internal combustion engine 10 and intake valves 21 for opening and closing the intake port 20. An injector 19 for supplying by injection fuel to be burnt in the combustion chamber 13 is arranged in the intake port 20. In this internal combustion engine 10 is also arranged a variable lift mechanism 50 for making the valve lift of the intake valves 21 variable.

In the combustion chamber 13 is arranged a spark plug 22 for igniting mixture gas of fuel supplied from the injector 19 by injection and air sucked through the intake passage 11. The spark plug 22 is connected to an igniter 22a for generating a high voltage current needed for igniting the mixture gas. The combustion chamber 13 is connected to the exhaust passage 12 via an exhaust port 24 formed in the cylinder head 10a of the internal combustion engine 10 and an exhaust valve 23 for opening and closing the exhaust port 24.

The internal combustion engine 10 is controlled by an electronic control unit (hereinafter abbreviated to ECU) 25. The ECU 25 comprises a CPU for executing various ways of processing pertaining to the control of the internal combustion engine 10, a memory for storing control programs and information needed for their controls, an input port and an output port for taking charge of respectively supplying and entering signals to and from outside.

To the input port of the ECU 25 are connected, in addition to the air flow meter 15 and the throttle sensor 18, sensors for detecting the needed information for controlling the engine including a crank sensor 26 for detecting the engine speed NE, an acceleration pedal sensor 27 for detecting the acceleration pedal depression degree ACCP, and a vehicle speed sensor 28 for detecting the vehicle speed SPD. To the output port of the ECU 25 are connected the throttle motor 17 and the injector 19, the igniter 22a and the variable lift mechanism 50.

<Variable Lift Mechanism>

Next will be described in detail the variable lift mechanism 50 used in this internal combustion engine 10 with reference to FIG. 2 through FIG. 6 together.

Figure 2:
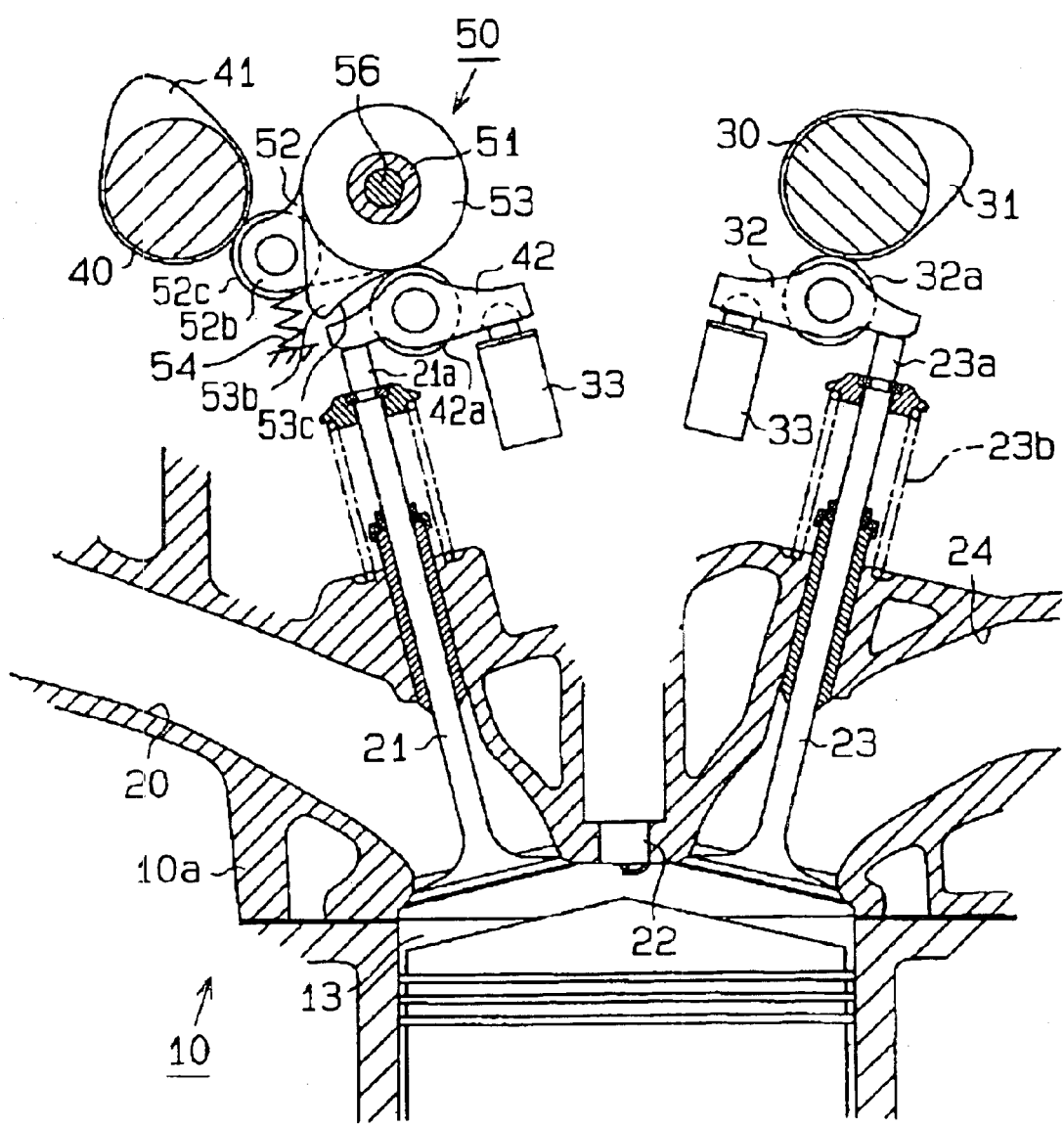
FIG. 2 is a cross-sectional view illustrating an upper part of the internal combustion engine shown in FIG. 1.

FIG. 2 shows a cross-section of the upper part of the internal combustion engine 10 in which the variable lift mechanism 50 is arranged. As shown in FIG. 2, an intake cam shaft 40 and an exhaust cam shaft 30 which turn interlocked with the revolution of the internal combustion engine 10 are rotatably supported on the cylinder head 10a of the internal combustion engine 10.

Underneath the exhaust cam shaft 30 is arranged a roller rocker arm 32 provided with a roller 32a. The roller 32a is in contact with, and subject to the pressure of, an exhaust cam 31 provided on the exhaust cam shaft 30. One end of the roller rocker arm 32 is supported by a lash adjuster 33 fixed to the cylinder head 10a, while the other end is kept in contact with a tappet 23a at the upper end of the exhaust valve 23. The end of the roller rocker arm 32 kept in contact with the tappet 23a is pressed by a valve spring 23b of the exhaust valve 23, and that pressing force keeps the roller 32a in contact with the exhaust cam 31 all the time. The exhaust valve 23 pressed in this way by the exhaust cam 31 via the roller rocker arm 32 is opened and closed always in a constant valve lift.

On the other hand, on the side of the intake valve 21, the variable lift mechanism 50 intervenes between an intake cam 41 and a roller rocker arm 42 provided on the intake cam shaft 40. To the intake valves 21 is transmitted via the variable lift mechanism 50, in addition to the roller rocker arm 42, the pressure of the intake cam 41.

The variable lift mechanism 50 has a configuration in which an input section 52 and a rocking cam 53 arranged on a supporting pipe 51 fixed to the cylinder head 10a. The input section 52 and the rocking cam 53 are provided with cylindrical housings 52a and 53a, respectively, arranged on the supporting pipe 51 to be rockable around its axis. To add, in this variable lift mechanism 50 are provided two rocking cams 53 for one input section 52 to match the two intake valves 21 provided in each cylinder of the internal combustion engine 10.

On the housing 52a of the input section 52 is formed an input arm 52b protruding in the radial direction. A roller 52c, kept in contact with the intake cam 41, is rotatably supported on the tip of the input arm 52b. The tip of the input arm 52b is pressed by a spring 54 arranged in a compressed state, in the direction of thrusting the roller 52c against the intake cam 41.

On the housing 53a of the rocking cam 53 is formed an output arm 53b protruding in its radial direction. One face of the output arm 53b constitutes a cam face 53c curved concavely. The cam face 53c is smoothly connected continuously to the base circle part of the housing 53a, i.e. the other part of the housing 53a than where the output arm 53b is protrusively formed. These pats, including the cam face 53c and the base circle part of the housing 53a, are in contact with a roller 42a of the roller rocker arm 42.

FIG. 3 shows a cutaway perspective view of the variable lift mechanism 50. As shown in this drawing, two rocking cams 53 are arranged on the variable lift mechanism 50 with the input section 52 in-between. The respective housings 52a and 53a of the input section 52 and the rocking cams 53 are formed in hollow cylindrical shapes, and the supporting pipe 51 penetrate them.

In the inner circumference of the housing 52a of the input section 52 is formed a helical spline 52d shaped in a right hand spiral, and in the inner circumference of the housings 53a of the rocking cams 53 are formed helical splines 53d shaped in a left hand spiral.

Slider gears 55 are arranged in a series of internal spaces formed by the respective housings 52a and 53a of the input section 52 and the two rocking cams 53. The slider gears 55 are formed in hollow, substantially columnar shapes, and snapped onto the supporting pipe 51 from outside to be able to reciprocate in its axial direction and to rotate relative to it around its axis.

In the outer circumferential faces of the slider gears 55 in their central part in the axial direction is formed a helical spline 55a which, shaped in a right hand spiral, is engaged with the helical spline 52d formed in the inner circumference of the housing 52a of the input section 52. In the outer circumferential faces of their two ends in the axial direction are formed helical splines 55b which, shaped in a left hand spiral, are engaged with the helical splines 53d formed in the inner circumference of the housings 53a of the rocking cams 53.

Between the helical spline 55a and the two helical splines 55b in the outer circumferential faces of the slider gears 55 are formed small diameter portions 55c smaller in outer diameter than those helical splines 55a and 55b. In one of those small diameter portions 55c is bored a long hole 55d extending in the circumferential direction.

Further, the inside of the supporting pipe 51 is slidably penetrated in its axial direction by a control shaft 56. The control shaft 56 is reciprocated by an actuator of a hydraulically drive, electrical or some other type in the axial direction relative to the supporting pipe 51.

An engaging pin 56a is formed on the control shaft 56 protruding in its radial direction. The engaging pin 56a is inserted into the long hole 55d via a long hole bored in the supporting pipe 51 extending in its axial direction. This enables the engaging pin 56a to shift the slider gears 55 in the axial direction according to their reciprocation in the axial direction while allowing the slider gears 55 to rotate relative to the supporting pipe 51.

In the variable lift mechanism 50 configured as described above, the valve lift of the intake valve 21 is continuously variable according to the shifting of the control shaft 56 in the axial direction by an actuator. This action of the variable lift mechanism 50 will be described below with reference to FIGS. 4 through 6 together.

FIG. 4(A) illustrates a state in which the base circle part of the intake cam 41 is in contact with the roller 52c of the input section 52 of the variable lift mechanism 50. The roller 42a of the roller rocker arm 42 then is not in contact with the output arms 53b of the rocking cams 53, but is in contact with the base circle parts of the housings 53a respectively adjoining those output arms 53b. The intake valve 21 then is in a state of closing the intake port 20.

When the intake cam shaft 40 rotates and the lift part of the intake cam 41 presses down the roller 52c of the input section 52, the input section 52 is turned counterclockwise in FIG. 4(A) relative to the supporting pipe 51, and at the same time the slider gears 55 and the rocking cams 53 are also turned integrally. As a result, the cam faces 53c formed on the output arms 53b of the rocking cams 53 are brought into contact with the roller 42a of the roller rocker arm 42 and, as shown in FIG. 4(B), the roller 42a is thrust down by the pressure of the cam faces 53c. This causes the roller rocker arm 42 to be rocked centering on the contact part of the lash adjuster 33, and the intake valve 21 is thereby opened.

In the variable lift mechanism 50, when the control shaft 56 is displaced by the actuator in the axial direction, the slider gears 55, interlocked with this displacement, are also displaced in the axial direction. Correspondingly to those displacements, the input section 52 and the rocking cams 53 spline-engaged with the slider gears 55 are rotated relative to the slider gears 55. The input section 52 and the rocking cams 53 then are rotated in reverse directions to each other on account of a difference between the helical splines in the direction of formation. As a result, the angle of nip $\phi$ between the input arm 52b and the output arms 53b around the axis the supporting pipe 51 is varied.

Figure 5A:
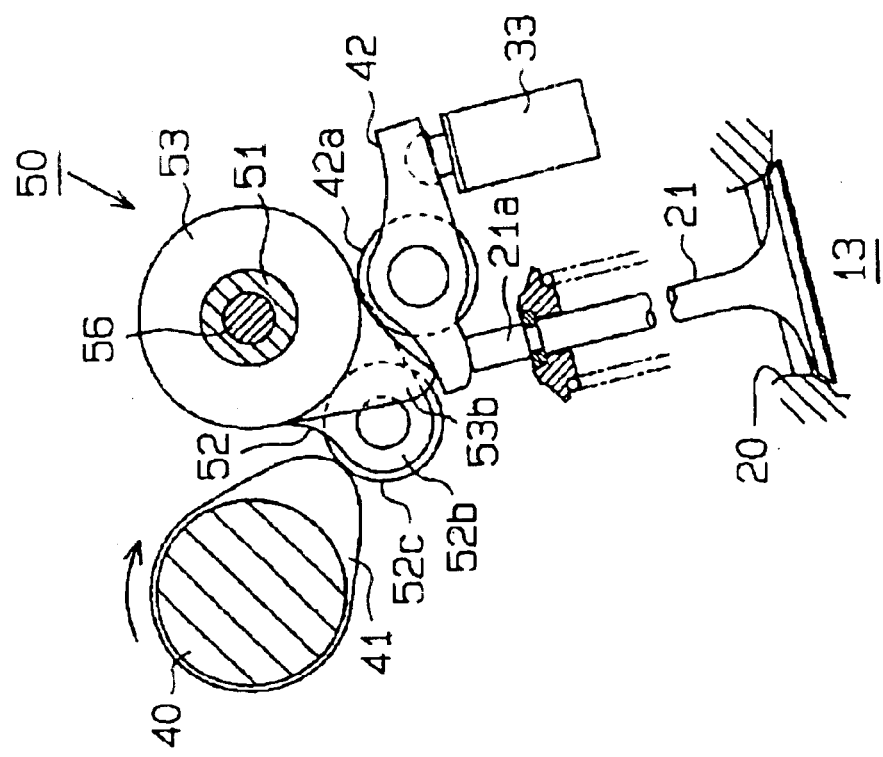
FIG. 5(A) and FIG. 5(B) are diagrams illustrating actions of the variable lift mechanism when the valve lift is reduced.

FIG. 5(A) shows a state in which the base circle part of the intake cam 41 is in contact with the roller 52c of the input section 52 with the angle of nip $\phi$ smaller than is shown in FIG. 4(A). The contact position of the roller 42a then in the rocking cams 53 is farther away from the cam faces 53c than in the state shown in FIG. 4(A).

Figure 5B:
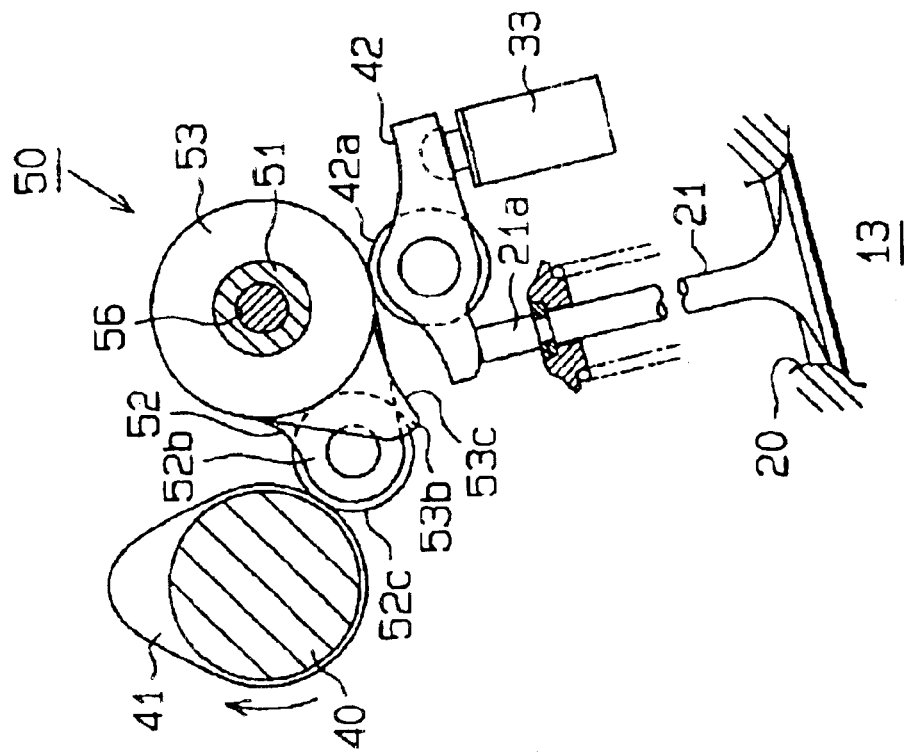

When the intake cam shaft 40 then turns to cause the lift part of the intake cam 41 presses down the roller 52c of the input section 52, the rocking cams 53 are rotated integrally with the input section 52. In this action, however, the pressing down of the roller 42a of the roller rocker arm 42 by the cam faces 53c is not started until the rocking cams 53 are fully rotated, delayed by as much as the contact position of the roller 42a in the rocking cams 53 in FIG. 5(A) is farther away from the cam faces 53c as stated above. Also, along with the pressing down of the lift part of the intake cam 41, the ranges of the cam faces 53c in contact with the roller 42a are narrowed only part of the base end side of each of the output arms 53b. As a result, the rocking range of the roller rocker arm 42 then corresponding to the pressing down of the roller 52c by the lift part of the intake cam 41 is narrowed, and the intake valve 21 is opened as much as matching the smaller valve lift as shown in FIG. 5(B).

Figure 6:
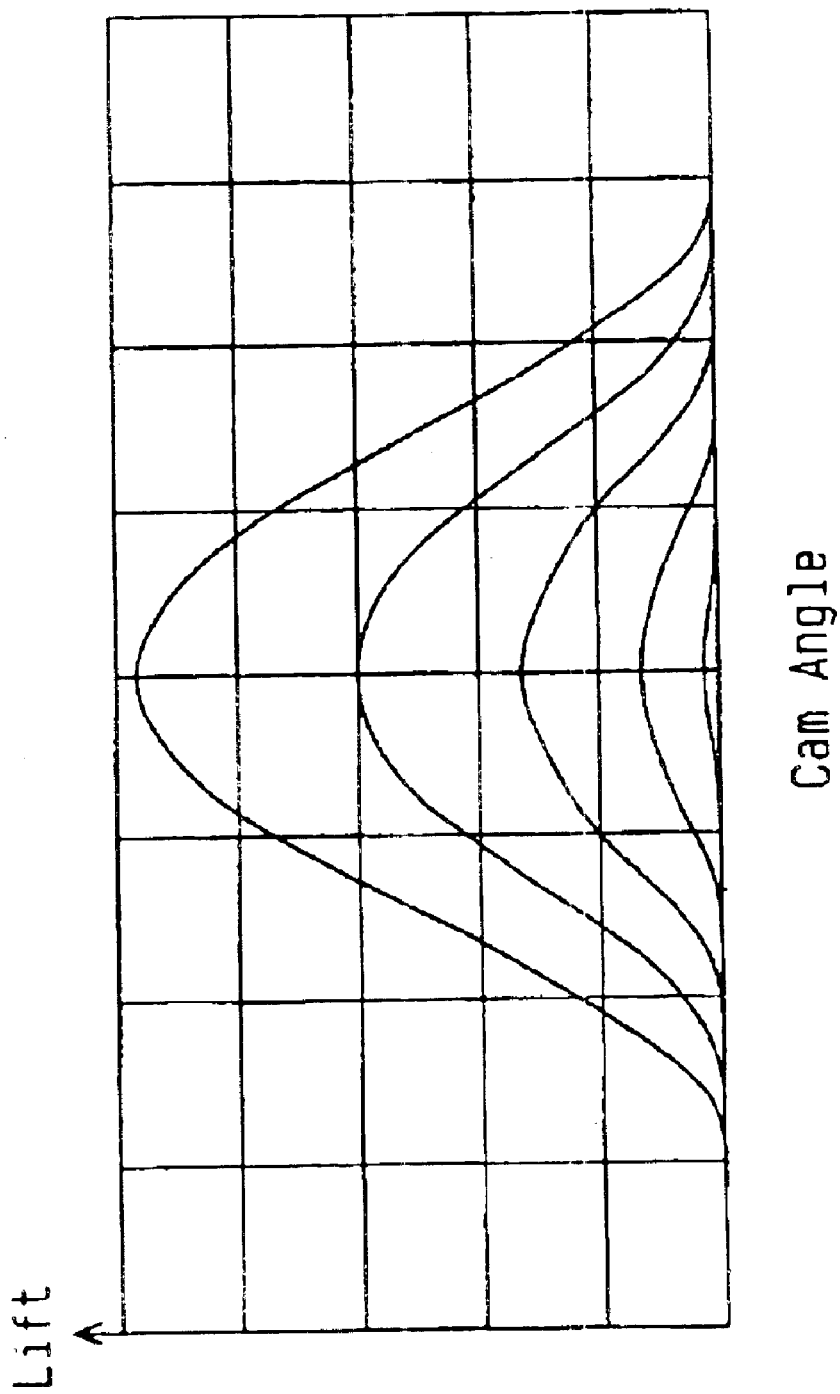
FIG. 6 is a graph showing how the valve lift is varied by the variable lift mechanism.

In this way, the variable lift mechanism 50 enables the valve lift of the intake valve 21 to be continuously varied as shown in FIG. 6. The control of the valve lift of the intake valve 21 by the variable lift mechanism 50 is performed by the ECU 25. The ECU 25 computes the target lift, which is the control target of the valve lift, according to the operating state of the engine, controls the valve lift of the intake valve 21 by regulating the driving of the actuator to adjust the quantity of displacement of the control shaft 56.

<Control at Deceleration>

Figure 7:
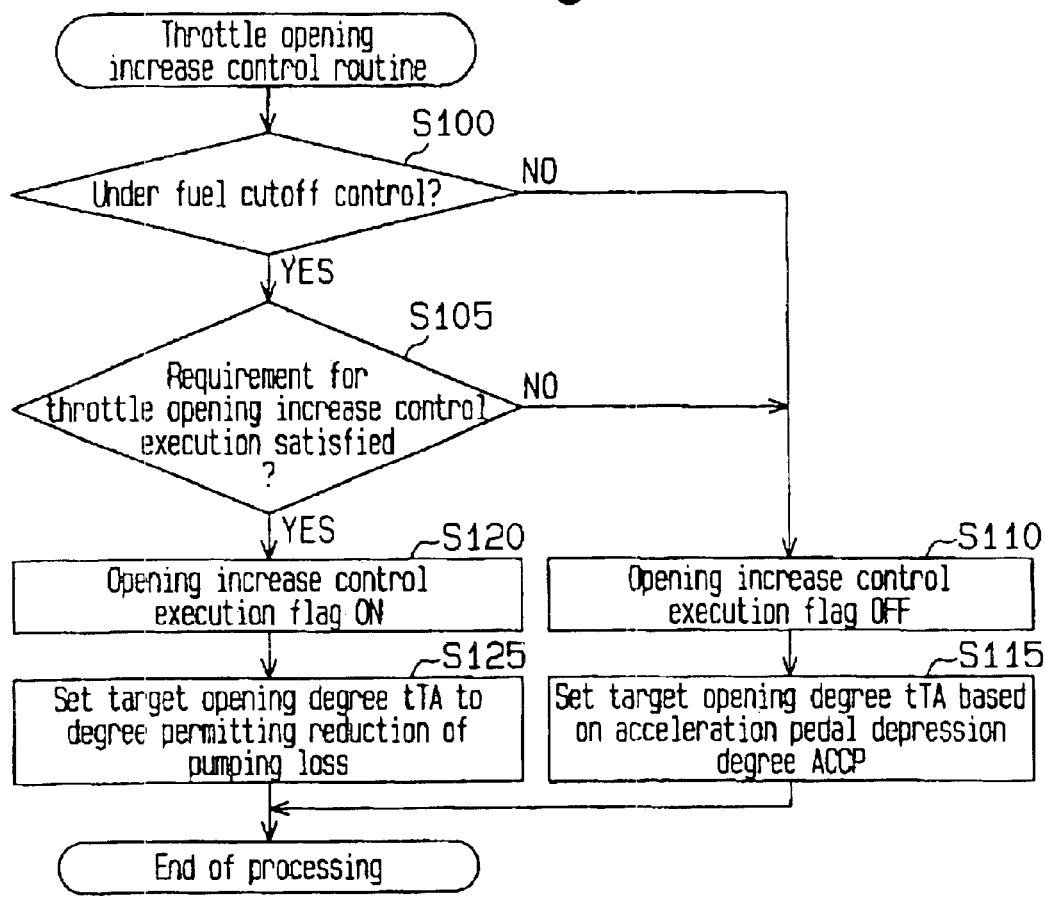
FIG. 7 is a flow flowchart of a throttle opening increase control.
Figure 8:
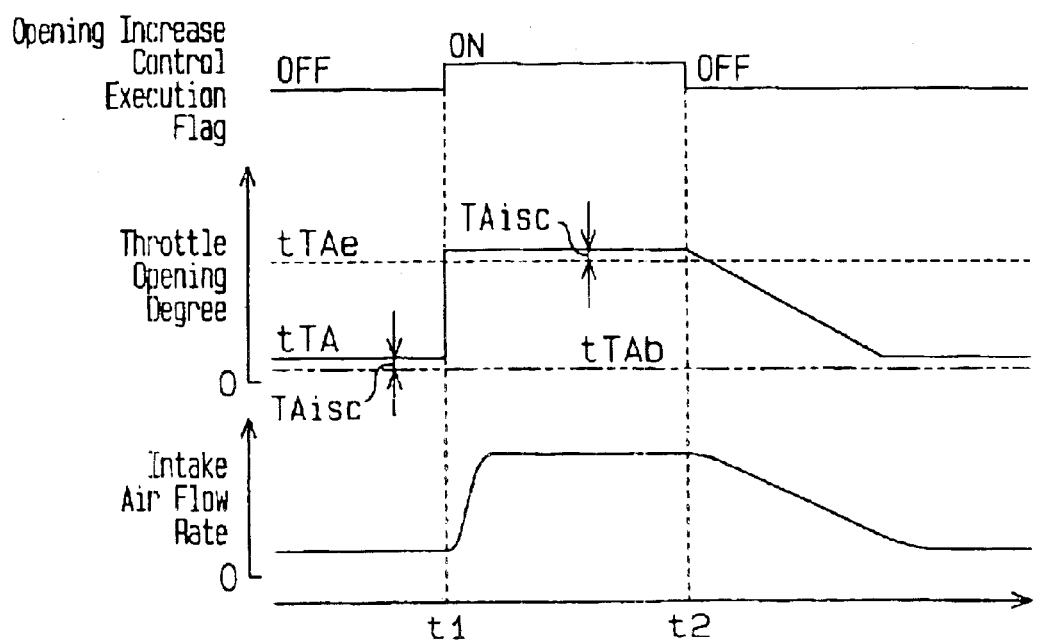
FIG. 8 is a time chart for describing the throttle opening increase control.

What follows is a description, with reference to FIG. 7 and FIG. 8 together, of control at deceleration executed when the vehicle speed is decelerated for the internal combustion engine 10 in the embodiment of the invention configured as described above.

On this internal combustion engine 10, fuel cutoff controls, which means temporary suspensions of fuel supply to the internal combustion engine 10 at the time of deceleration of the vehicle speed, are executed with a view to improving the engine's fuel efficiency. The ECU 25 executes a fuel cutoff control on condition of the satisfaction of both requirements (A1) and (A2) (collectively referred to as fuel cutoff requirement) below, and thereby temporarily suspends fuel supply from the injector 19 by injection and the ignition of mixture gas by the spark plugs 22.

(A1) The internal combustion engine 10 is in an idling state. In this embodiment, on condition that the value of the acceleration pedal depression degree ACCP is 0, i.e. the accelerator pedal is not depressed, and that the variation of the engine speed NE after the acceleration pedal is released has sufficiently converged, it is judged that the internal combustion engine 10 is in an idling state.

(A2) The engine speed NE is at or above a preset fuel cutoff permissible speed.

A discontinuation of a fuel cutoff control, i.e. resumption of the suspended fuel supply, is executed on condition of the satisfaction of either of the requirements (B1) and (B2) (return requirement or resumption requirement) below during the execution of a fuel cutoff control.

(B1) The internal combustion engine 10 goes out of the idling state as the driver depresses on the acceleration pedal again or otherwise.

(B2) The engine speed NE falls below a preset fuel supply requiring speed. The fuel supply requiring speed does not mean an engine speed at which fuel supply is actually resumed, but means an engine speed at which control pertaining to resumption of fuel supply is started or an engine speed at which resumption of fuel supply is demanded.

The requirement (B2) may be that the vehicle speed SPD falls below a preset fuel supply requiring speed.

Further, in this internal combustion engine 10, to appropriately adjust the strength of engine braking with the pumping loss of the internal combustion engine 10 to which fuel supply is suspended, a throttle opening increase control is executed during a fuel cutoff control. The throttle opening increase control is executed when the engine is operating under conditions where the pumping loss of the internal combustion engine 10 becomes too great during the fuel cutoff control or when the transmission is shifted down during the fuel cutoff control.

When the throttle opening increase control is executed, the ECU 25 sets the target opening degree tTA of the throttle valve 16 to a sufficiently greater degree than the usual target opening degree to match the acceleration pedal depression degree ACCP. Incidentally, when the fuel cutoff control is executed on condition that the acceleration pedal is not depressed, the usual target opening degree tTA is set to a small degree near total closure.

FIG. 7 is a flowchart of the throttle opening increase control routine. The processing of this routine is periodically executed by the ECU 25.

At step S100 of this routine, the ECU 25 judges whether or not the engine 10 is under a fuel cutoff control. The ECU 25 further judges at step S105 whether or not the requirement for the execution of the throttle opening increase control stated above are satisfied.

If the judgment at either step S100 or step S105 is negative, the ECU 25 proceeds to step S110 and turns off the opening increase control execution flag. At the next step S115, the ECU 25 sets a target opening degree tTA for the throttle valve 16 on the basis of the acceleration pedal depression degree ACCP, and temporarily ends this routine. To go into more detail, the aforementioned setting of the target opening degree tTA at step S115 is accomplished in accordance with the following formula (1), where "tTAb" is the basic target opening degree, whose value is figured out according to the acceleration pedal depression degree ACCP, and "TAiac" is the ISC demanded opening degree, which is the learned value of the throttle opening degree TA during idling operation.

$$tTA \leftarrow tTAb + TAisc \tag{1}$$

On the other hand, if the outcome is positive at both of the foregoing steps S100 and S105, the ECU 25 proceeds to step S120 and turns on the opening increase control execution flag. Then the ECU 25, at the next step S125, sets a sufficiently large opening degree to reduce the pumping loss as the target opening degree tTA of the throttle valve 16, and temporarily ends this routine. To go into more detail, the aforementioned setting of the target opening degree tTA at step S125 is accomplished in accordance with the following formula (2), where "tTAe" is ECT demanded opening degree, whose value is figured out on the basis of the engine speed NE and other factors. The ECT demanded opening degree tTAe is set to a sufficiently large value relative to the basic target opening degree tTAb obtained when the acceleration pedal depression degree ACCP is 0.

$$tTA \leftarrow tTAe + TAisc \tag{2}$$

FIG. 8 charts an example of throttle opening increase control during a fuel cutoff control. Until time t1 in this chart, the ECU 25 sets the target opening degree tTA of the throttle valve 16 to a degree matching the acceleration pedal depression degree ACCP, calculated by the formula (1) above.

If the above-described requirement for execution of the throttle opening increase control is satisfied at time t1, the ECU 25 turns on the opening increase control execution flag, and varies the target opening degree tTA to a sufficiently large value calculated by the formula (2) above. This causes the opening degree of the throttle valve 16 to be increased, the intake air flow rate is increased, and the pumping loss of the internal combustion engine 10 is reduced.

If the above-described requirement for execution of the throttle opening increase control fails to be satisfied at time t2, the ECU 25 turns off the opening increase control execution flag, and reduces the target opening degree tTA to the degree calculated by the formula (1) above. In this embodiment, an abrupt increase in pumping loss is restrained by gradually reducing the target opening degree tTA then as shown in FIG. 8, and a shock which would result from a decreasing of the target opening degree tTA is thereby suppressed.

By performing the throttle opening increase control described above during a fuel cutoff control, an excessive engine braking force or a shock due to the down shifting of the transmission are prevented from occurring.

Incidentally, if fuel supply is resumed when the throttle opening degree is kept large by such throttle opening increase control, even if the throttle opening degree is immediately decreased, a greater quantity of air than is appropriate continues to be let into the combustion chamber 13 for some time on account of a delay in air flow from the throttle valve 16 to the combustion chamber 13. As a consequence, a greater drive power may be generated immediately after the resumption of fuel supply than is intended by the driver.

On the other hand, in the internal combustion engine 10 provided with the variable lift mechanism 50, the quantity of air let into the combustion chamber 13 can also be reduced by the control of the valve lift of the intake valve 21 by that variable lift mechanism 50. Such a way of controlling the valve lift can promptly reduce the quantity of air let into the combustion chamber 13 with substantially no delay in the response of air flow.

In view of this point, if throttle opening increase control of the throttle valve 16 is being executed in this embodiment when discontinuation of a fuel cutoff is demanded, fuel supply will be resumed after reducing the quantity of air let into the cylinders under control of the valve lift of the intake valve 21 by the variable lift mechanism 50. In this way, the aforementioned generation of a greater drive power than is intended by the driver is restrained.

<Return Control>

Details of a return control performed in response to a demand for resumption of fuel supply made during the execution of the aforementioned throttle opening increase control will be described below. The return control is executed in the following modes to be detailed below.

Figure 9:
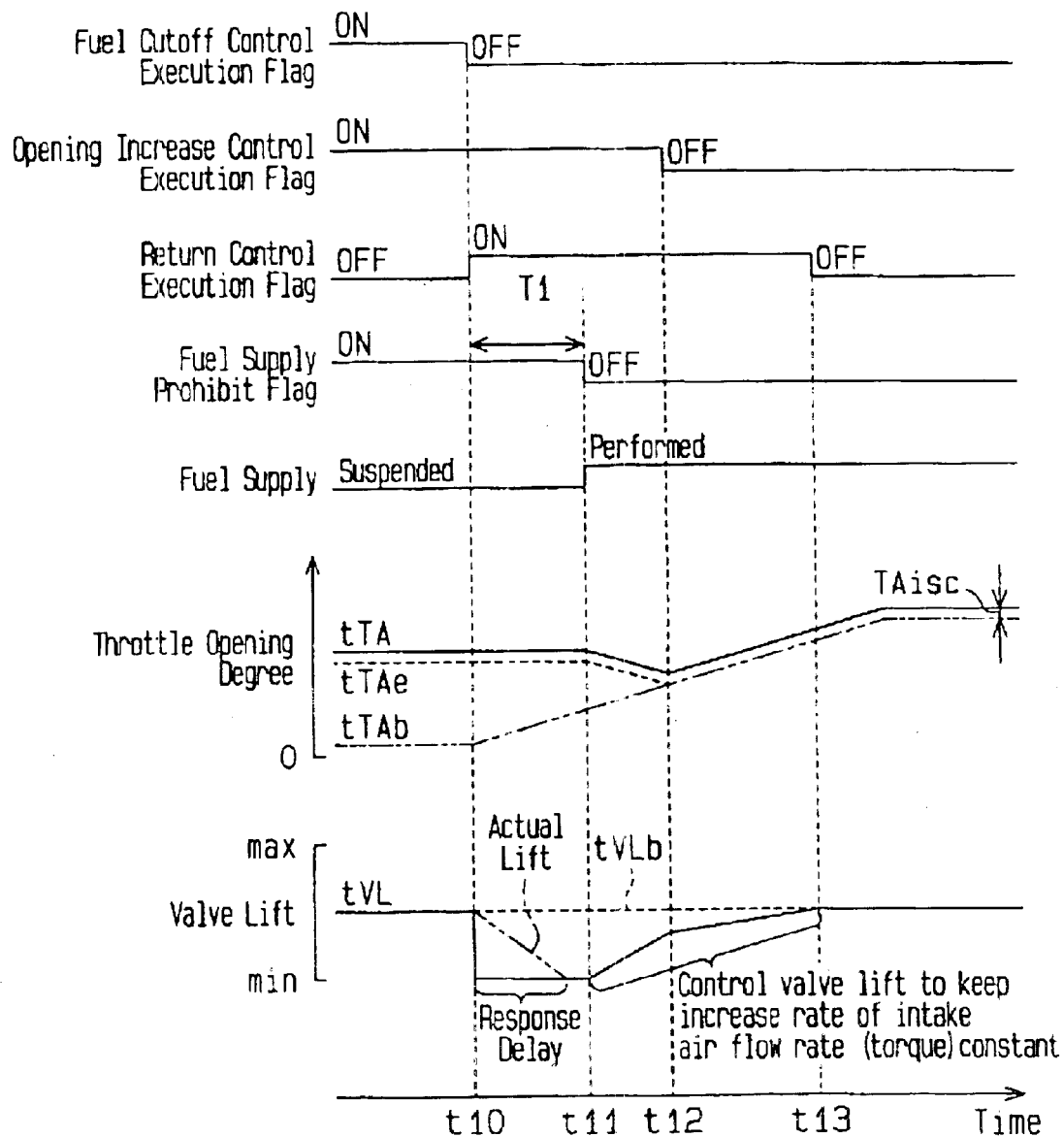
FIG. 9 is a time chart showing an example of a return control.
Figure 10:
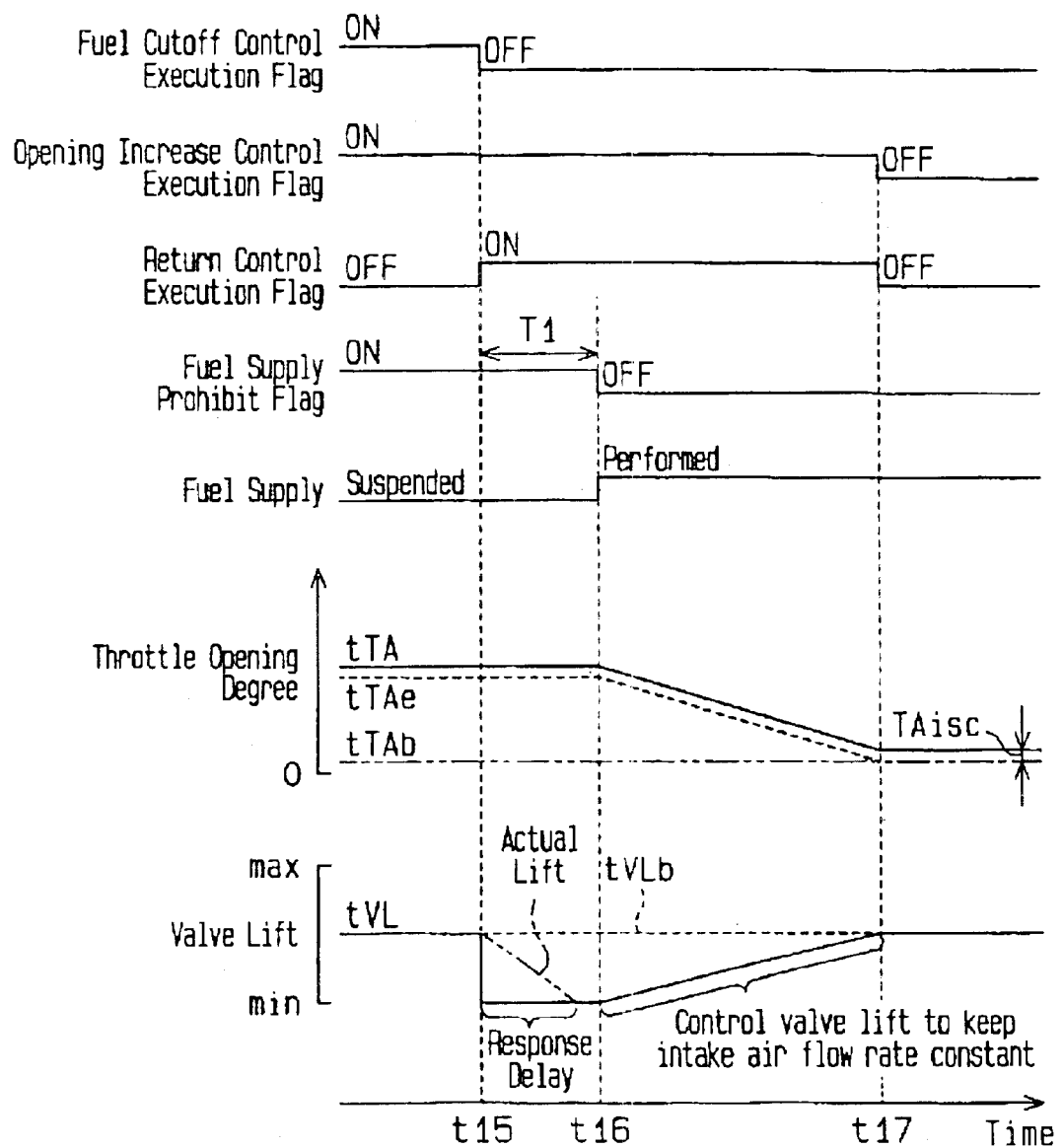
FIG. 10 is a time chart showing another example of a return control.

FIG. 9 and FIG. 10 show examples of the return control. A fuel cutoff control execution flag shown in these drawings indicates that the fuel cutoff control is being executed; it is turned on at the time of starting the fuel cutoff control and turned off when a demand for resumption of fuel supply is made. A return control execution flag indicates that the return control is being executed, and a fuel supply prohibit flag indicates that fuel supply is prohibited, or suspended.

First will be described with reference to FIG. 9 the mode of the return control when resumption of fuel supply is done due to the driver re-depressing on the acceleration pedal. In the example of control illustrated in this drawing, at time t10 when the fuel cutoff control and the throttle opening increase control are being executed, the requirement for resumption of fuel supply (the resumption requirement) is satisfied in response to re-depressing by the driver on the acceleration pedal. Until this time t10, the fuel cutoff control execution flag, the opening increase control execution flag, and the fuel supply prohibit flag are on, and the target opening degree tTA of the throttle valve 16 is set to a sufficiently greater value than normal when the acceleration pedal is not depressed.

Now when the resumption requirement is satisfied at time t10, the ECU 25 turns off the fuel cutoff control execution flag. If the throttle opening increase control is not executed at time t10, the ECU 25 at this point of time turns off the fuel supply prohibit flag and immediately resume fuel supply. On the other hand, if the throttle opening increase control is being executed (the opening increase control execution flag: on) at the time the resumption requirement is satisfied, the ECU 25, as shown in FIG. 9, does not turn off the fuel supply prohibit flag at this point of time, temporarily put on hold the resumption of fuel supply, turn on the return control execution flag and then start the return control.

When the return control is started, the ECU 25 reduces the target lift tVL, which is the control target value of the valve lift of the intake valve 21, to the minimum lift VLMIN, which is the lower limit of its variable range. This results in contraction of the valve lift of the intake valve 21, and the quantity of air let into the combustion chamber 13 is rapidly reduced. On the other hand, the ECU 25 does not reduce the target opening degree tTA of the throttle valve 16 at this time t10, and temporarily holds it at the large opening degree under the throttle opening increase control.

At time t11 when a prescribed length of time T1 has passed from that time t10, the ECU 25 turns off the fuel supply prohibit flag and resumes fuel supply. The length of time T1 here during which the resumption of fuel supply is put on hold is preset long enough to enable the quantity of air let into the combustion chamber 13 to be adequately reduced after altering the minimum lift VLMIN to the target lift tVL, with an allowance for some delay in the responsive operation of the variable lift mechanism 50.

After time t11 when fuel supply is resumed, the ECU 25 gradually reduces the target opening degree tTA of the throttle valve 16 from the large degree at the time of the throttle opening increase control to the normal degree calculated by the formula (1) above, which normal degree corresponds to the acceleration pedal depression degree ACCP. When the target opening degree tTA is reduced to its normal degree by time t12, the ECU 25 turns off the opening increase control execution flag. After the opening increase control execution flag is turned off, the target opening degree tTA of the throttle valve 16 is set to the normal degree calculated by the formula (1) above.

On the other hand, after time T11 when fuel supply is resumed, the ECU 25 gradually raises the target lift tVL of the intake valve 21 from the minimum lift VLMIN to its due target level. The target lift tVL then is so raised that the intake air flow rate increases at a fixed rate according to variations of the throttle opening degree TA accompanying the aforementioned decreasing of the target opening degree tTA. This causes the torque of the internal combustion engine 10 to increase at a fixed rate.

After that, the ECU 25 turns off the return control execution flag and ends the return control at time t13 when both the target opening degree tTA of the throttle valve 16 and the target lift tVL of the intake valve 21 have come to their respective normal values.

Next will be described with reference to FIG. 10 the mode of return control when resumption of fuel supply is caused by a drop of the engine speed NE to or below the fuel supply requiring speed in a state in which the throttle opening increase control is being executed during a fuel cutoff control.

As shown in FIG. 10, the fuel cutoff control and the throttle opening increase control are being executed at time t15. If the requirement for resumption of fuel supply (the resumption requirement) is satisfied by a drop in the engine speed NE at this time t15, the ECU 25, as in the case of FIG. 9, turns off the fuel cutoff control execution flag, turns on the return control execution flag and starts the return control. In this case, too, at this time t15, the fuel supply prohibit flag is not turned off, and resumption of fuel supply is put on hold temporarily.

When the return control is started, the ECU 25, while keeping the target opening degree tTA of the throttle valve 16 temporarily held at the large opening degree under the throttle opening increase control, reduces the target lift tVL of the intake valve 21 to the minimum lift VLMIN. At time t16 after the lapse of the length of time T1 from that time t15, the ECU 25 turns off the fuel supply prohibit flag and resumes fuel supply.

From this time t16 onward, the ECU 25 gradually reduces the target opening degree tTA of the throttle valve 16 until it falls to the normal degree calculated by the formula (1) above, which normal degree corresponds to the acceleration pedal depression degree ACCP. Then, according to the reduction of the throttle opening degree due to the target opening degree tTA, the ECU 25 gradually raises the target lift tVL of the intake valve 21 to its due target level so that the air quantity actually let into the combustion chamber 13 is maintained at a fixed rate.

After that, the ECU 25 turns off the return control execution flag and ends the return control at time t17 when both the target opening degree tTA of the throttle valve 16 and the target lift tVL of the intake valve 21 have come to their respective normal values.

By the return control so far described, the intake air flow rate increased under the throttle opening increase control is reduced by utilizing the variable lift mechanism 50, which can adjust the intake air flow rate in a shorter period of time than the throttle valve 16. For this reason, it is possible to promptly reduce the intake air flow rate after resumption of fuel supply is demanded, and any drive power unintended by the driver immediately after the resumption of fuel supply can be suppressed.

Figure 11:
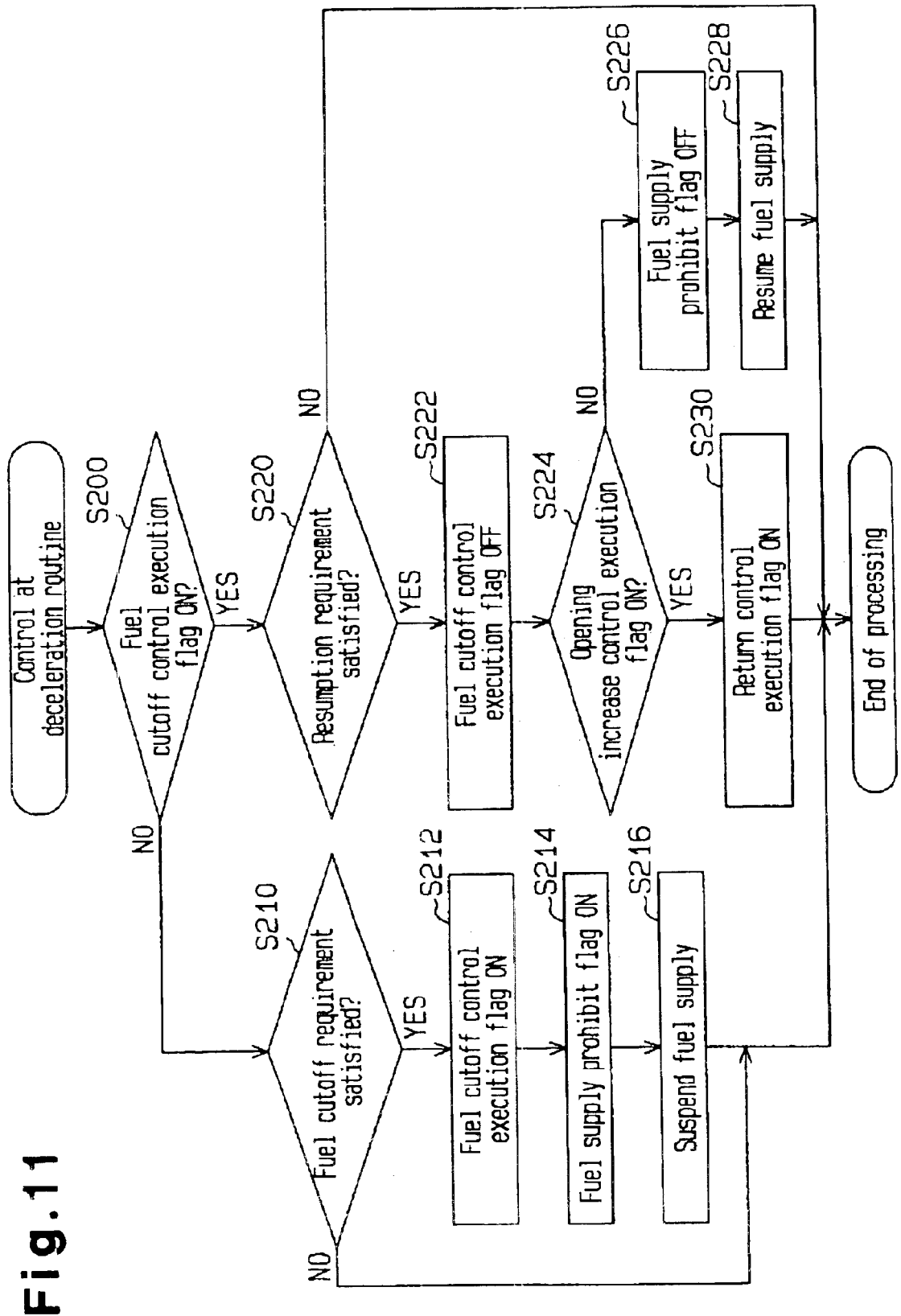
FIG. 11 is a flowchart of control performed in deceleration.

FIG. 11 is a flowchart of a control at deceleration routine pertaining to the judgment as to whether or not a fuel cutoff control is executed and a return control is executed. Processing of this routine is periodically executed by the ECU 25.

When the processing of this routine is started, first it is judged at step S200 whether or not the fuel cutoff control execution flag is on, i.e. whether or not a fuel cutoff control is being executed. If the fuel cutoff control execution flag is off, the processing proceeds to step S210. If the fuel cutoff control execution flag is on, the processing proceeds to step S220.

At step S210, the ECU 25 judges whether or not the fuel cutoff requirement is satisfied. If the fuel cutoff requirement is not satisfied, the ECU 25 temporarily ends the processing of this routine as it is. On the other hand, if the fuel cutoff requirement is satisfied, the ECU 25 proceeds to step S212, and turns on the fuel cutoff control execution flag. Also, the ECU 25 at step S214 turns on the fuel supply prohibit flag and, temporarily ends the processing of this routine after suspending fuel supply to the internal combustion engine 10 at step S216. This causes a fuel cutoff control to be executed.

On the other hand, if the fuel cutoff control execution flag is on (S200: YES), the ECU 25 at step S220 judges whether or not the resumption requirement for fuel supply is satisfied. If the resumption requirement is satisfied, the ECU 25 proceeds to step S222. If the resumption requirement is not satisfied, the ECU 25 temporarily ends the processing of this routine as it is.

Upon proceeding the processing to step S222, the ECU 25 turns off the fuel cutoff control execution flag. Then the ECU 25, at the following step S224, judges whether or not the opening increase control execution flag is on, i.e. whether or not the throttle opening increase control is being executed at the time resumption of fuel cutoff is demanded.

If the opening increase control execution flag is off, the ECU 25 at step S226 turns off the fuel supply prohibit flag, and temporarily ends the processing of this routine after resuming fuel supply at step S228. Thus, unless throttle opening increase control is being executed at the time resumption of fuel supply is demanded, fuel supply is immediately resumed at the demand for resumption of fuel supply.

On the other hand, if the opening increase control execution flag is on, the ECU 25 at step S230 turns on the return control execution flag, and temporarily ends the processing of this routine. This causes the above-described return control to be executed.

Figure 12:
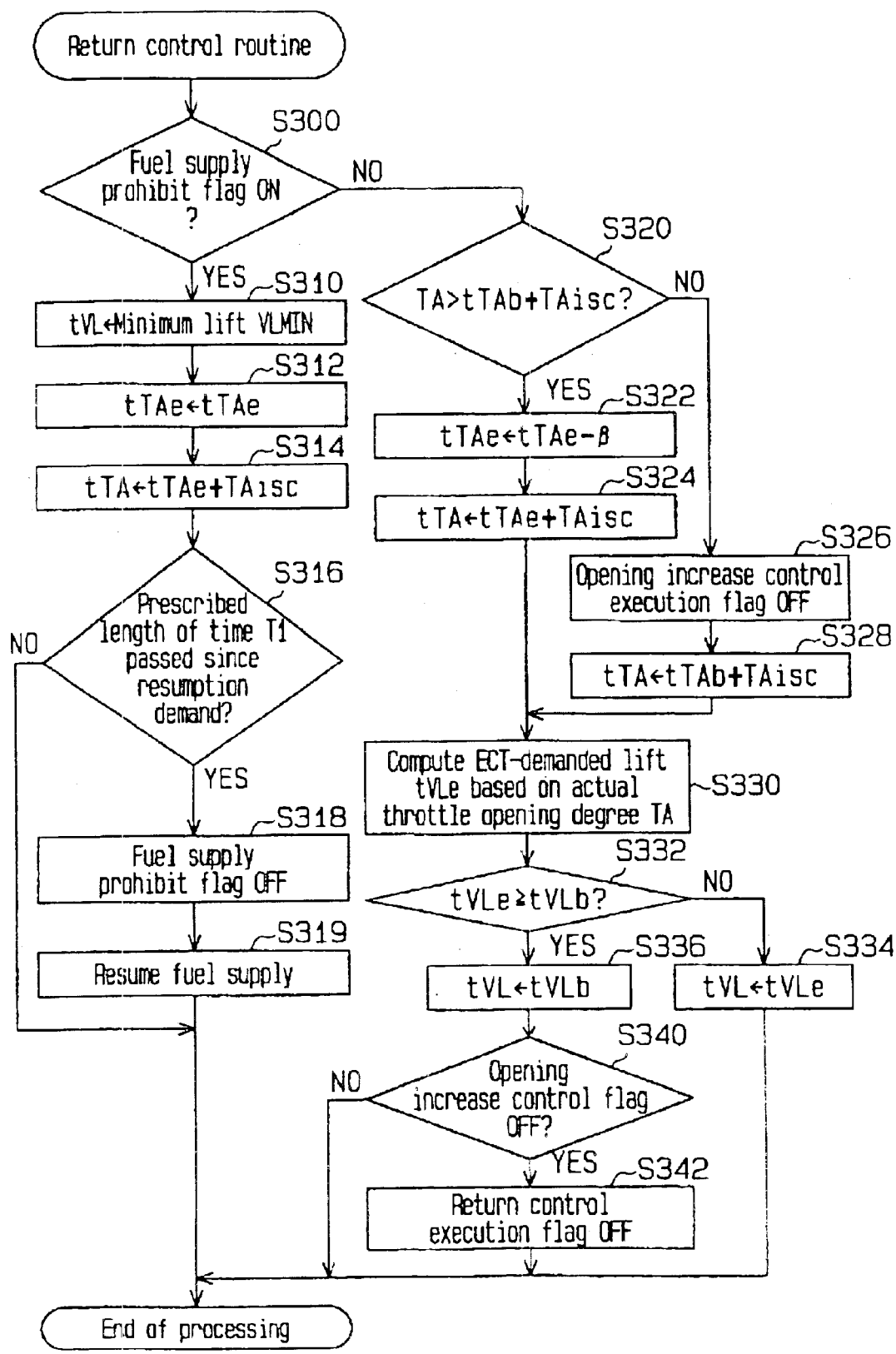
FIG. 12 is a flowchart of a return control.

FIG. 12 is a flowchart showing the sequence of processing of a return control routine. The processing of this routine is executed, on condition that the return control execution flag is on, by the ECU 25 following the control at deceleration of FIG. 11.

When the processing of this routine is started, first at step S300, it is judged whether or not the fuel supply prohibit flag is on. If the fuel supply prohibit flag is on, the ECU 25 proceeds to step S310 and set the target lift tVL of the intake valve 21 to the minimum lift VLMIN. Also, the ECU 25 causes the target opening degree tTA of the throttle valve 16 to be held at the large degree, which is set in the throttle opening increase control, through the processing of step S312 and step S314.

After that, the ECU 25 at step S316 judges, after a demand for resumption of fuel supply, whether or not the prescribed length of time T1 has passed. If here the length of time T1 has not passed, the ECU 25 temporarily ends the processing of this routine as it is. If the length of time T1 has passed, the ECU 25 turns off the fuel supply prohibit flag at step S318 and temporarily ends the processing of this routine after resuming fuel supply at step S319.

On the other hand, if it is judged at step S300 that the fuel supply prohibit flag is off, the ECU 25 judges at step S320 whether or not the actual throttle opening degree TA is above the usual target opening degree (=tTAb+TAisc) set according to the acceleration pedal depression degree ACCP. If the judgment here is positive, i.e. if the opening degree of the throttle valve 16 has not yet been reduced to the usual target opening degree, the ECU 25 reduces the target opening degree tTA of the throttle valve 16 by a prescribed value p through the processing at step S322 and step S324, and then proceeds to step S330. On the other hand, if the judgment at step S320 is negative, the ECU 25 turns off the opening increase control execution flag at step S326, and proceeds to step S330 after setting at step S328 the target opening degree tTA to the aforementioned usual target opening degree.

At step S330, the ECU 25 computes the ECT-demanded lift tVLe on the basis of the actual throttle opening degree TA at the time. The value of the ECT-demanded lift tVLe is so set that the actual intake air flow rate smoothly varies until it eventually arrives at a level matching the acceleration pedal depression degree ACCP, irrespective of any changes of the throttle opening degree during the return control.

At the next step S332, it is judged whether or not the ECT-demanded lift tVLe is not less than the basically demanded lift tVLb. The basically demanded lift tVLb, which is a control target value set for the valve lift of the intake valve 21 under usual control, except the return control, is computed on the basis of the engine speed NE and the load on the engine.

If the ECT-demanded lift tVLe is less than the basically demanded lift tVLb, the ECU 25 proceeds to step S334, sets the ECT-demanded lift tVLe to the target lift tVL, and temporarily ends the processing of this routine.

On the other hand, if the ECT-demanded lift tVLe is not less than the basically demanded lift tVLb, it is determined that the target lift tVL of the intake valve 21 is returned from the minimum lift VLMIN to its usual value. In this case, the ECU 25 sets the basically demanded lift tVLb to the target lift tVL at step S336. If the opening increase control execution flag is off then (S340: YES), i.e. if the target opening degree tTA of the throttle valve 16 is also returned to its usual degree, the ECU 25 turns off the return control execution flag at step S342 and ends the return control.

In this embodiment, the ECU 25 functions as valve lift reducing means. That is, the ECU 25 controls the variable lift mechanism 50 to reduce the target lift tVL of the intake valve 21 when resumption of fuel supply is demanded during the execution of the throttle opening increase control.

This embodiment of the invention so far described can provide the following advantages.

(1) In this embodiment, when assumption of fuel supply is demanded during the throttle opening increase control, the intake air flow rate, which has been increased under the throttle opening increase control, is reduced by using the variable lift mechanism 50. The variable lift mechanism 50 adjusts the intake air flow rate in a shorter period of time than the throttle valve 16 does. For this reason, the intake air flow rate is promptly reduced after resumption of fuel is demanded, and accordingly any drive power unintended by the driver immediately after the resumption of fuel supply is effectively suppressed.

(2) In this embodiment, at the time the requirement for resumption of fuel supply is satisfied, the resumption of fuel supply, i.e. discontinuation of fuel cutoff, is suspended until the prescribed length of time T1 has passed after the target lift tVL of the intake valve 21 is reduced. When the prescribed length of time T1 has passed, the valve lift of the intake valve 21 has been sufficiently reduced. For this reason, even if the action of the variable lift mechanism 50 is delayed in operation response, any drive power unintended by the driver is ensured to be effectively suppressed.

(3) In this embodiment, after the resumption of fuel supply during the return control, the target lift tVL of the intake valve 21 is set according to variations in the throttle opening degree so that the intake air flow rate smoothly varies irrespective of any changes of the throttle opening degree. As a result, torque variations of the internal combustion engine 10 after the resumption of fuel supply is appropriately averted.

Next will be described a second embodiment of the present invention with reference to FIG. 13 and FIG. 14 together with main focus on its differences from the first embodiment.

In the first embodiment, the throttle opening degree is held at the large degree (tTAe+TAisc), which is set under the throttle opening increase control, from start of the return control until resumption of fuel supply, followed by a gradual reducing of the throttle opening degree. Then, when the throttle opening degree has been reduced to a degree corresponding to the acceleration pedal depression degree ACCP (tTAb+TAisc), the target opening degree tTA of the throttle valve 16 is set to a degree corresponding to the acceleration pedal depression degree ACCP.

In such a case, the throttle opening degree is set irrespective of acceleration pedal depressing by the driver during the transient period of the return control (from time t11 to t12 in FIG. 9, and from time t16 to t17 in FIG. 10), which transient period corresponds to a period from the resumption of fuel supply until the setting of the target opening degree tTA to a degree corresponding to the acceleration pedal depression degree ACCP. For this reason, the internal combustion engine 10 may fail to behave matching accelerator pedal depressing by the driver. For instance, even if the driver makes such an operation as will reduce the acceleration pedal depression degree ACCP during the transient period, the torque of the internal combustion engine 10 will not be reduced, or even increased in some cases against the driver's operation.

In view of this problem, in this second embodiment, the target opening degree tTA of the throttle valve 16 and the target lift tVL of the intake valve 21 under the return control are set in the following manner with an eye to suppressing any behavior of the internal combustion engine 10 not corresponding to the driver's operation. Thus in this embodiment, after the start of the return control, the target opening degree tTA is set to a degree corresponding to the acceleration pedal depression degree ACCP, which degree is computed by the formula (1) above. However, if the throttle opening degree TA under the return control becomes smaller than a certain limit, the pumping loss will increase excessively and may invite an excessive fall of the engine speed NE during the return control. For this reason, a lower limit TALOW is set for the target opening degree tTA during the return control and, when the target opening degree tTA computed by the formula (1) falls below that lower limit TALOW, the lower limit TALOW is set as the target opening degree tTA.

Figure 13:
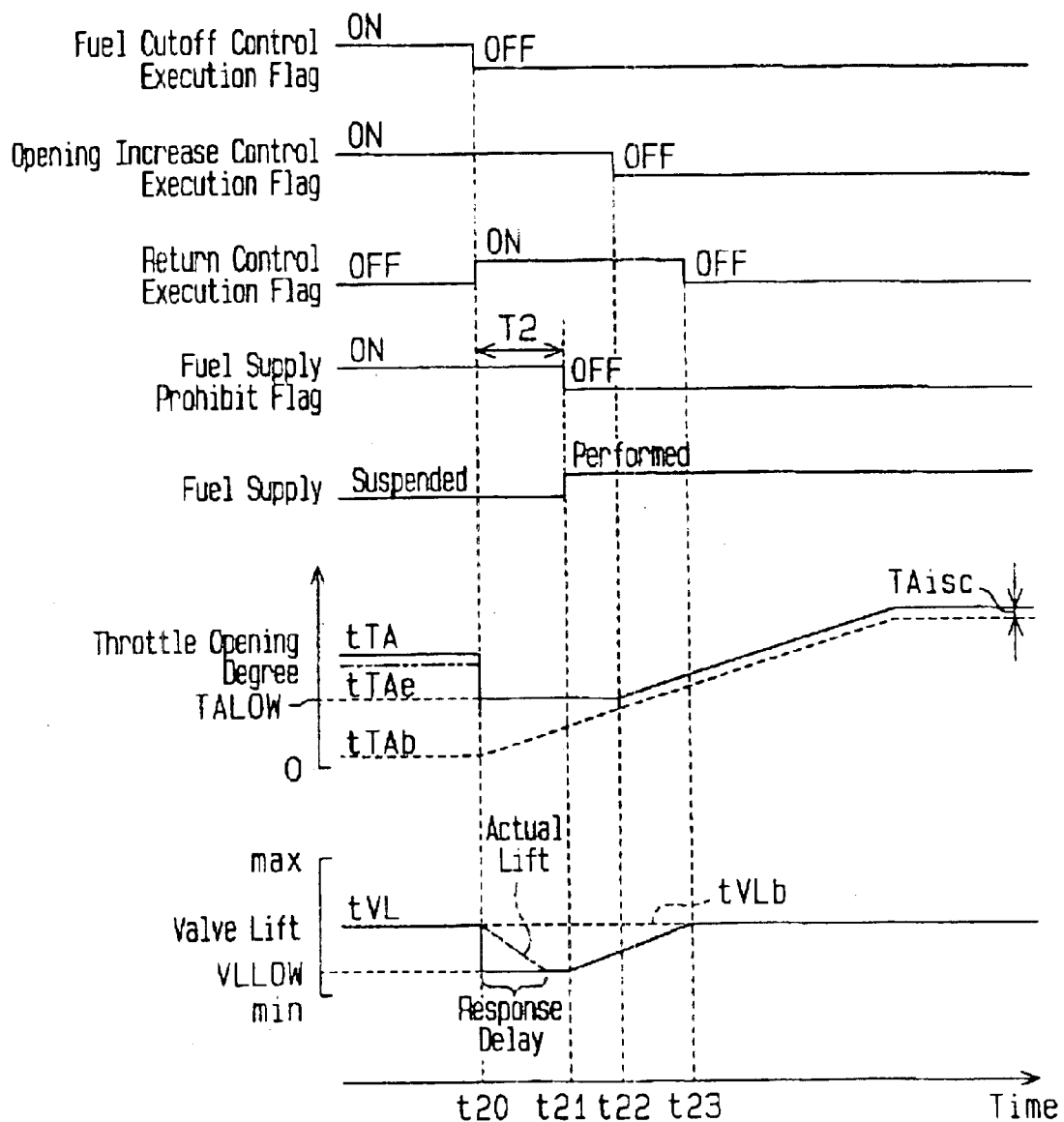
FIG. 13 is a time chart showing an example of a return control according to a second embodiment of the invention.

FIG. 13 shows an example of such return control in this embodiment. In this example of control, the requirement for resumption of fuel supply is satisfied at time t20 when the fuel cutoff control and the throttle opening increase control are being executed, and the return control is started.

Now, when the resumption requirement is satisfied at time t20, the ECU 25 turns off the fuel cutoff control execution flag and turns on the return control execution flag to start the return control. At this point of time, the fuel supply prohibit flag is not turned off, and the resumption of fuel supply is temporarily put on hold.

When the return control is started, the ECU 25 reduces the target opening degree tTA of the throttle valve 16, which was set under the throttle opening increase control to a large degree (tTAe+TAisc), toward a degree (tTAb+TAisc) corresponding to the acceleration pedal depression degree ACCP but not below the lower limit TALOW. Along with this, the ECU 25 reduces the target lift tVL of the intake valve 21 to a prescribed level VLLOW. The throttle opening degree TA is reduced from immediately after the start of the return control because of the setting of the target opening degree tTA as described above. Accordingly, the target lift tVL at the time is set greater than in the first embodiment in which the throttle opening degree TA after the start of the return control is held at the degree during the throttle opening increase control.

At time t21 when a prescribed length of time T2 has passed since the start of the return control, the ECU 25 turns off the fuel supply prohibit flag and resumes fuel supply. As the length of time T2 during which the resumption of fuel supply is suspended, like the length of time T1 in the first embodiment, a period that is long enough for sufficiently reducing the air quantity to be let into the combustion chamber 13 is preset, with due consideration given to any delay in response pertaining to the operation of the variable lift mechanism 50. In this embodiment, however, this length of time T2 is set shorter than the length of time T1 since the value set as the target lift tVL of the intake valve 21 after the start of the return control is greater than that in the first embodiment.

If the opening degree (tTAb+TAisc) corresponding to the acceleration pedal depression degree ACCP, which opening degree computed by the formula (1) above, reaches or surpasses the lower limit TALOW at time t22, the ECU 25 turns off the opening increase control execution flag, and sets the subsequent target opening degree tTA to a usual value determined according to the acceleration pedal depression degree ACCP.

On the other hand, after the resumption of fuel supply at the time t21, the ECU 25 gradually increases the target lift tVL of the intake valve 21 from the prescribed level VLLOW to its due level. The increase of the target lift tVL then is so accomplished that the intake air flow rate be expanded at a fixed increased rate to match the variations of the throttle opening degree TA accompanying the aforementioned decreasing of target opening degree tTA. This enables the torque of the internal combustion engine 10 to increase at a fixed rate.

After that, at time t23 when both the target opening degree tTA of the throttle valve 16 and the target lift tVL of the intake valve 21 have resumed their respective usual values, the ECU 25 turns off the return control execution flag and ends the return control.

Figure 14:
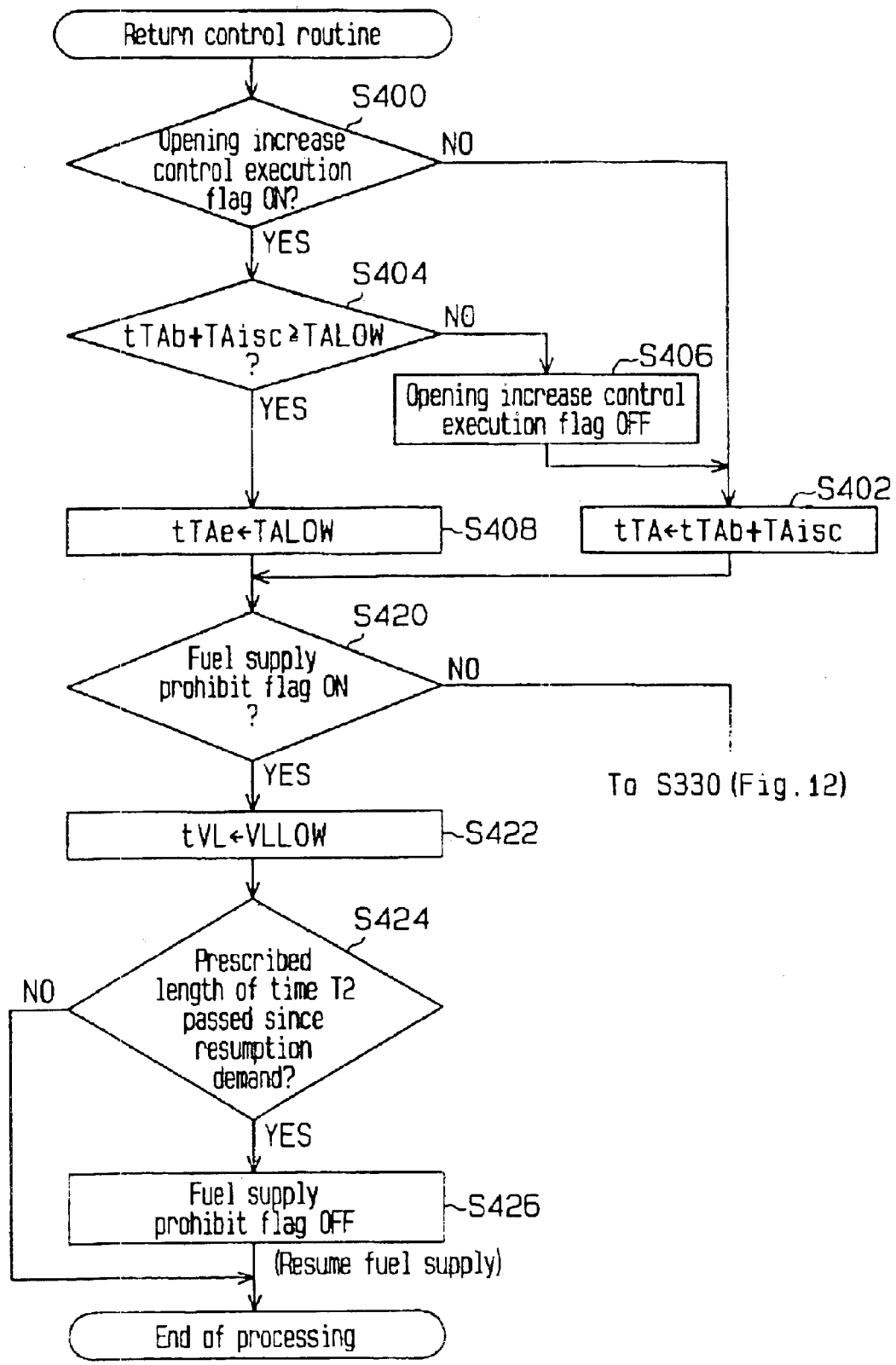
FIG. 14 is a flowchart of a return control applied to the second embodiment of the invention.

FIG. 14 is a flowchart of a return control routine in this embodiment. The processing of this routine, like that in the first embodiment, is executed by the ECU 25 following the control at deceleration of FIG. 11 on condition that the return control execution flag is on.

Upon start of the processing of this routine, the ECU 25, first at step S400, judges whether or not the opening increase control execution flag is on. If the opening increase control execution flag is off, the ECU 25 proceeds to step S402.

When proceeding to step S402, the ECU 25 sets the target opening degree tTA to the opening degree (tTAb+TAisc) corresponding to the acceleration pedal depression degree ACCP computed on the basis of the formula (1) above, and proceeds to step S420.

If the opening increase control execution flag is on at step S400, the ECU 25 proceeds to step S404, and judges whether or not the opening degree (tTAb+TAisc) computed on the basis of the formula (1) above is not below the aforementioned lower limit TALOW. If the judgment here is positive, the ECU 25 proceeds to step S420 after setting the target opening degree tTA to its lower limit TALOW at step S408. Or if the judgment is negative, the. ECU 25 proceeds to the processing at step S402 mentioned above after turning off the opening increase control execution flag at step S406.

At step S420 the ECU 25 judges whether or not the fuel supply prohibit flag is on. The ECU 25, if the fuel supply prohibit flag is on, proceeds to step S422, or, if the fuel supply prohibit flag is off, proceeds to step S330 in FIG. 12. The processing by the ECU 25 after proceeding to step S330 is as described above.

When proceeding to step S422, the ECU 25 sets the target lift tVL of the intake valve 21 to the prescribed level VLLOW. Further the ECU 25, if the prescribed length of time T2 has passed after resumption of fuel supply is demanded, i.e. after the start of the return control (S424: YES), turns off the fuel supply prohibit flag at step S426 to resume fuel supply, and temporarily ends the processing of this routine.

The second embodiment of the invention so far described provides, in addition to the advantages stated in (1) through (3) above, an advantage of suppressing such behavior of the internal combustion engine 10 as does not correspond to any operation by the driver during the return control.

Next will be described a third embodiment of the present invention with reference to FIG. 15 and FIG. 16 together with main focus on its differences from the earlier described embodiments.

As described above, control of the valve lift of the intake valve 21 adjusts the air quantity let into the combustion chamber 13 more rapidly than opening increase control of the throttle valve 16. However, the operation of the variable lift mechanism 50 is likely to have a delay in response, the intake air flow rate increased by the throttle opening increase control cannot be reduced instantaneously. For this reason, in each of the embodiments described above, the resumption of fuel supply is put on hold until the prescribed length of time T1 or T2 passes after the start of the return control, sometimes resulting in delayed acceleration of the vehicle after the driver depresses on the acceleration pedal again. In view of this problem, the way of the return control in this embodiment eliminates the delay in acceleration of the vehicle while preventing the generation of excessive drive power by allowing resumption of fuel supply immediately after the satisfaction of the requirement for resumption of fuel supply, carrying out a retardation control of the ignition timing and thereby limiting the torque of the internal combustion engine 10.

Figure 15:
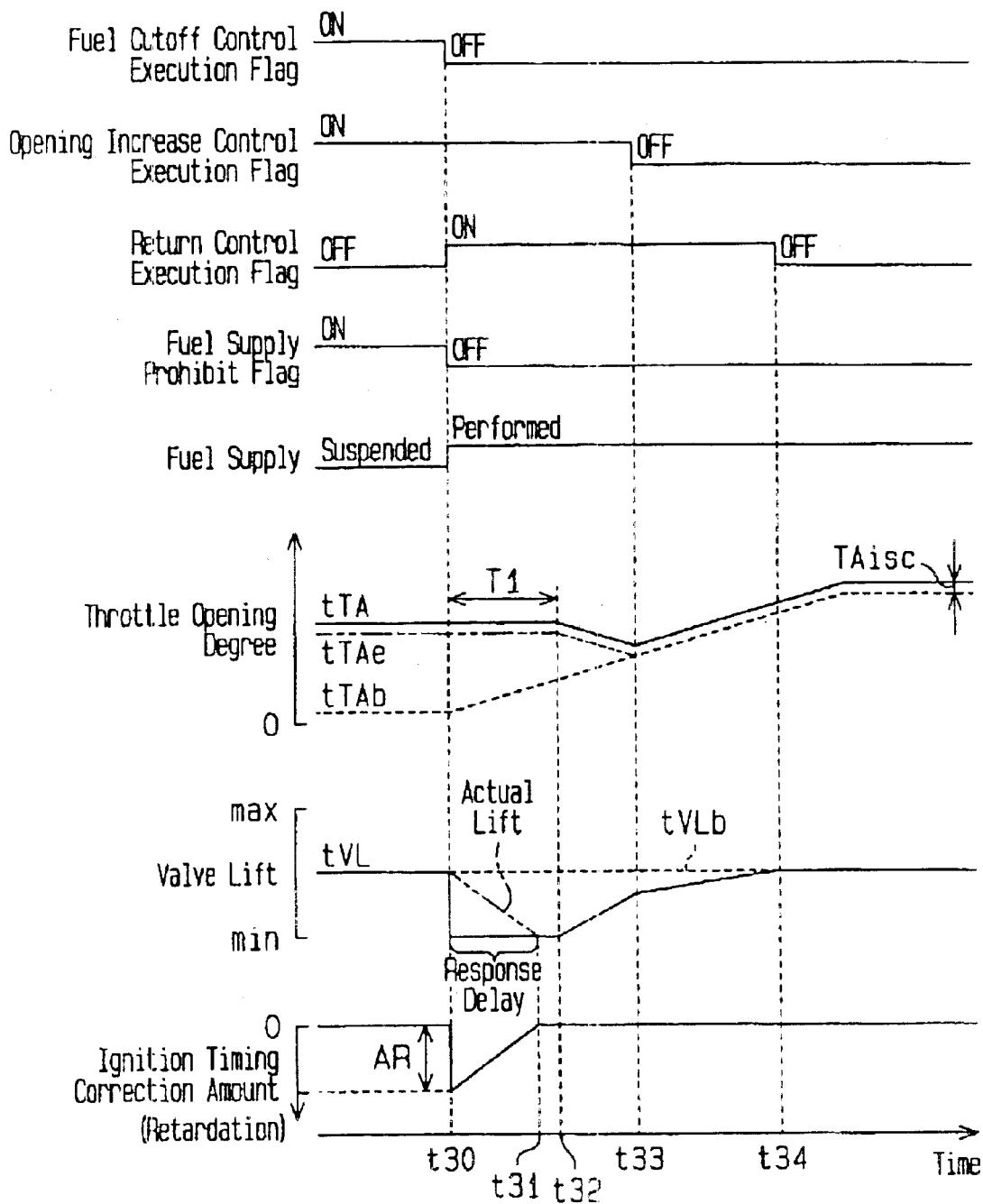
FIG. 15 is a time chart showing an example of a return control according to a third embodiment of the invention.

FIG. 15 shows an example of such return control in this embodiment of the invention. In this example of control, at time t30 when the fuel cutoff control and the throttle opening increase control are being executed, the requirement for resumption of fuel supply is satisfied, and thus the return control is started. When the resumption requirement is satisfied, the ECU 25 turns off the fuel cutoff control execution flag and turns on the return control execution flag to start the return control. Also at this time t30, the ECU 25, while holding the target opening degree tTA of the throttle valve 16 at its value until then, reduces the air quantity let into the combustion chamber 13 by reducing the target lift tVL of the intake valve 21 to the prescribed level VLLOW. Simultaneously, the ECU 25 turns off the fuel supply prohibit flag to resume fuel supply in this embodiment.

On account of the aforementioned delayed response of the operation of the variable lift mechanism 50, it is not until time t31 that the valve lift of the intake valve 21 (the actual lift) is actually reduced to the altered target lift tVL, and a greater quantity of air than what is due is let into the combustion chamber 13 until time t31.

In view of this problem, to reduce the extra part of the torque boosted by the air quantity excessively let in, the ECU 25 in this embodiment sets an ignition timing correction amount as shown in FIG. 15 to delay ignition timing during the period from time t30 until time t31. The ignition timing correction amount then in FIG. 15, after being set to a prescribed value AR at time t30 in view of the transition of the actual lift illustrated therein, is gradually returned to 0.

Further the ECU 25, at and after time t32 by which the length of time T1 has passed since the start of the return control, gradually reduces the target opening degree tTA of the throttle valve 16 until it reaches the usual value (tTAb+TAisc) corresponding to the acceleration pedal depression degree ACCP, which usual value is computed by the formula (1) above. When the target opening degree tTA is reduced to the value corresponding to the acceleration pedal depression degree ACCP at time t33, the ECU 25 turns off the opening increase control execution flag.

On the other hand the ECU 25, from the aforementioned time t32 onward, gradually increases the target lift tVL of the intake valve 21 so that the intake air flow rate be smoothly increased at a fixed rate along with the transition of the throttle opening degree TA. After that, at time t34 when both the target opening degree tTA of the throttle valve 16 and the target lift tVL of the intake valve 21 have returned to their respective usual values, the ECU 25 turns off the return control execution flag and ends the return control.

Figure 16:
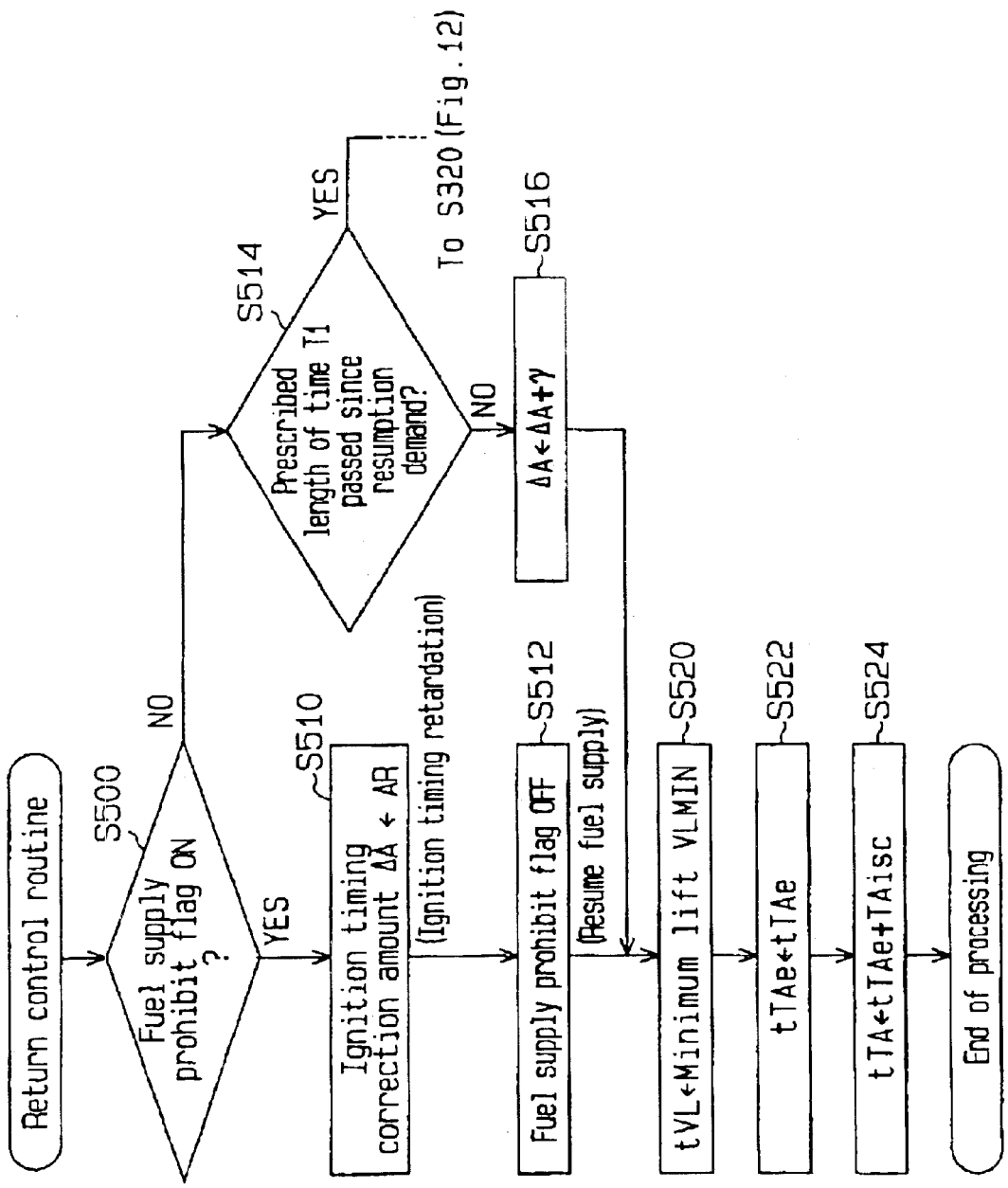
FIG. 16 is a flowchart of a return control applied to the third embodiment of the invention.

FIG. 16 is a flowchart of a return control routine in this embodiment of the invention. The processing of this routine too, like that in the first embodiment, is executed by the ECU 25 following the control at deceleration of FIG. 11, on condition that the return control execution flag is on.

When the processing of this routine is started, the ECU 25 at step S500 judges whether or not the fuel supply prohibit flag is on. The ECU 25, if the fuel supply prohibit flag is on, proceeds to step S510 and sets the ignition timing correction amount ΔA to the aforementioned prescribed value AR. At the next step S512, the ECU 25 turns off the fuel supply prohibit flag and proceeds to the processing of step S520.

On the other hand the ECU 25, if the fuel supply prohibit flag is off (S500: NO), proceeds to step S514 and, judges whether or not the prescribed length of time T1 has passed after resumption of fuel supply is demanded. If here the prescribed length of time T1 has not passed, the ECU 25 proceeds to step S516, increases the ignition timing correction amount ΔA by a prescribed value γ, and proceeds to step S520. If the prescribed length of time T1 has passed (S514: YES), the ECU 25 proceeds to the processing of step S320 in FIG. 12. The processing by the ECU 25 after proceeding to step S320 is as described above.

At step S520, the ECU 25 sets the target lift tVL of the intake valve 21 to the minimum lift VLMIN mentioned above. Then the ECU 25, after so setting at step S522 and step S524 the target opening degree tTA that the throttle opening degree during the throttle opening increase control preceding the start of the return control is held, temporarily ends the processing of this routine.

The return control in this embodiment of the invention so far described achieves an immediate resumption of fuel supply after the resumption of fuel supply is demanded, while appropriately suppressing the generation of any drive power unintended by the driver.

Although execution of the return control in any of the embodiments described above makes possible appropriate suppression of the generation of any drive power unintended by the driver, it may invite a delay in the timing of resumption of fuel supply or in the rise of the engine speed NE and, depending on the degree of the fall of the engine speed NE before or after the resumption of fuel supply, give rise to engine stalling. The occurrence of such engine stalling is appropriately prevented by implementing at least one of the measures stated in (I) through (VI) below.

(I) When the vehicle speed SPD at the time of fuel-supply-resumption demand is lower than a certain level, execution of the return control is prohibited. In other words, on condition that the vehicle speed SPD is no less than a predetermined value when resumption of the fuel supply is required, the ECU 25 permits the variable lift mechanism 50 to reduce the valve lift.

(II) When the engine speed NE at the time of fuel-supply-resumption demand is lower than a certain level, execution of the return control is prohibited. In other words, on condition that the engine speed NE is no less than a predetermined value when resumption of the fuel supply is required, the ECU 25 permits the variable lift mechanism 50 to reduce the valve lift.

(III) In a situation in which the return control is to be executed, i.e. during execution of the throttle opening increase control, the engine speed or the vehicle speed at which start controlling pertaining to resumption of fuel supply is set higher than in any other situation. Thus in a situation in which the return control is to be executed, resumption of fuel supply is demanded at a higher engine speed or vehicle speed than in any other situation.

(IV) On the basis of the rate of deceleration or the like of the vehicle before the return control, the vehicle speed SPD at the end of return control or the amount of drop of the vehicle speed SPD during the period of the return control is predicted. Then on the basis of the result of the prediction, the start timing of the return control is determined such that the return control ends at a prescribed level of the vehicle speed SPD where engine stalling is averted. In other words, based on the rate of deceleration of the vehicle before resumption of the fuel supply is required, the ECU 25 predicts at least one of the vehicle speed SPD when the suspension of resumption of the fuel supply is removed and the amount of drop of the vehicle speed SPD during the suspension of resumption of the fuel supply. Then based on the result of the prediction, the ECU 25 sets a time at which the variable lift mechanism 50 starts reducing the valve lift such that the suspension of resumption of the fuel supply is removed at a predetermined vehicle speed SPD where engine stalling is averted., (V) On the basis of the rate of deceleration or the like of the engine speed NE before the return control, the engine speed NE at the end of the return control or the amount of drop of the engine speed NE during the period of the return control is predicted. Then on the basis of the result of the prediction, the start timing of the return control is determined such that the return control ends at a prescribed level of the engine speed NE where engine stalling is averted. In other words, based on the rate of deceleration of the engine speed NE before resumption of the fuel supply is required, the ECU 25 predicts at least one of the engine speed NE when the suspension of resumption of the fuel supply is removed and the amount of drop of the engine speed NE during the suspension of resumption of the fuel supply. Then based on the result of the prediction, the ECU 25 sets a time at which the variable lift mechanism 50 starts reducing the valve lift such that the suspension of resumption of the fuel supply is removed at a predetermined engine speed NE where engine stalling is averted.

(VI) On the basis of the measured deceleration rate of the vehicle speed/engine speed since the start of the return control, the vehicle speed/engine speed at the end of the return control is predicted. If the predicted vehicle speed/engine speed at the end of the return control is low enough to invite engine stalling, the increase rate of the target lift tVL of the intake valve 21 after the resumption of fuel supply under the return control is set greater than what it would be otherwise. This serves to raise the increase rate of the intake air flow rate (the torque rise rate) after the resumption of fuel supply, and thereby to advance the end of the return control.

Figure 17:
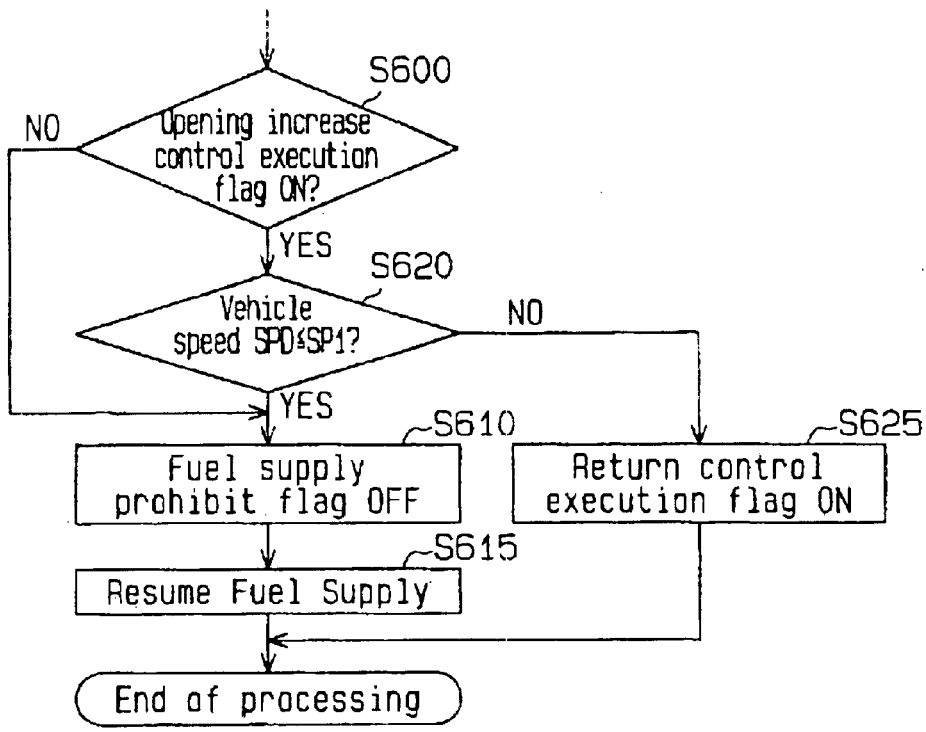
FIG. 17 is a flowchart of control performed in deceleration in another embodiment of the invention to which a measure against engine stalling is applied.

FIG. 17 is a flowchart of processing pertaining to measure (I) above. The processing of FIG. 17 is executed by the ECU 25 following the processing at step S222 of FIG. 11.

Upon proceeding to the processing of FIG. 17, the ECU 25 first at step S600 judges whether or not the opening increase control execution flag is on. The ECU 25, if the opening increase control execution flag is on, proceeds to step S620 or, if the opening increase control execution flag is off, proceeds to step S610.

When proceeding to step S610, the ECU 25 turns off the fuel supply prohibit flag and, after resuming fuel supply at the next step S615, temporarily ends the processing of this routine. Thus in this case, resumption of fuel supply is immediately accomplished without executing return control.

On the other hand, when proceeding to step S620, the ECU 25 judges whether or not the vehicle speed SPD is at or below a prescribed criterion SP1. As the criterion SP1 is set the lower limit of the vehicle speed SPD at the time of starting return control, which lower limit would allow completion of the return control without inviting engine stalling if the return control is executed in the present state. The ECU 25 proceeds to the aforementioned step S610 if the vehicle speed SPD is at or below the prescribed criterion SP1. The ECU 25, if the vehicle speed SPD is above the prescribed criterion SP1, after turning on the return control execution flag at step S625, temporarily ends the processing of this routine.

In the foregoing sequence of processing, the return control is executed only when the vehicle speed SPD at the time resumption of fuel supply is demanded is above the criterion SP1, and otherwise fuel supply is resumed immediately after the resumption of fuel supply is demanded even if the throttle opening increase control is being executed then. For this reason, the processing described above makes it possible to appropriately avert the occurrence of engine stalling ensuing from the execution of return control.

Figure 18:
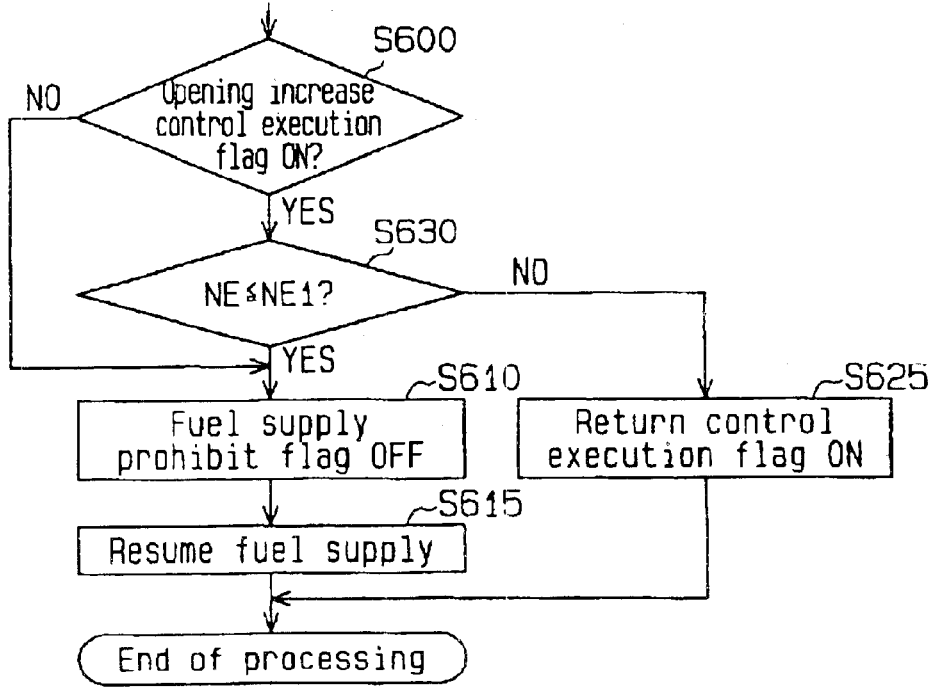
FIG. 18 is a flowchart of control performed in deceleration in the other embodiment of the invention to which another measure against engine stalling is applied.

On the other hand, FIG. 18 is a flowchart of processing pertaining to measure (II) above. In the flowchart of FIG. 18, the processing of step S620 of FIG. 17 is replaced with the processing of step S630.

Thus in the processing of FIG. 18, the ECU 25 judges whether or not the engine speed NE is at or below a prescribed criterion NE1 at step S630. Then the ECU 25, if the engine speed NE is at or below the criterion NE1, proceeds to step S610 mentioned above or, if the engine speed NE is above the criterion NE1, proceeds to step S625. As the criterion NE1 here is set the lower limit of the engine speed NE at the time of starting return control, which lower limit would allow completion of the return control without inviting engine stalling if the return control is executed in the present state.

In the foregoing sequence of processing, the return control is executed only when the engine speed NE at the time resumption of fuel supply is demanded is sufficiently high, and otherwise fuel supply is resumed immediately after the resumption of fuel supply is demanded even if the throttle opening increase control is being executed then. For this reason, the processing described above also makes it possible to appropriately avert the occurrence of engine stalling ensuing from the execution of return control.

Figure 19:
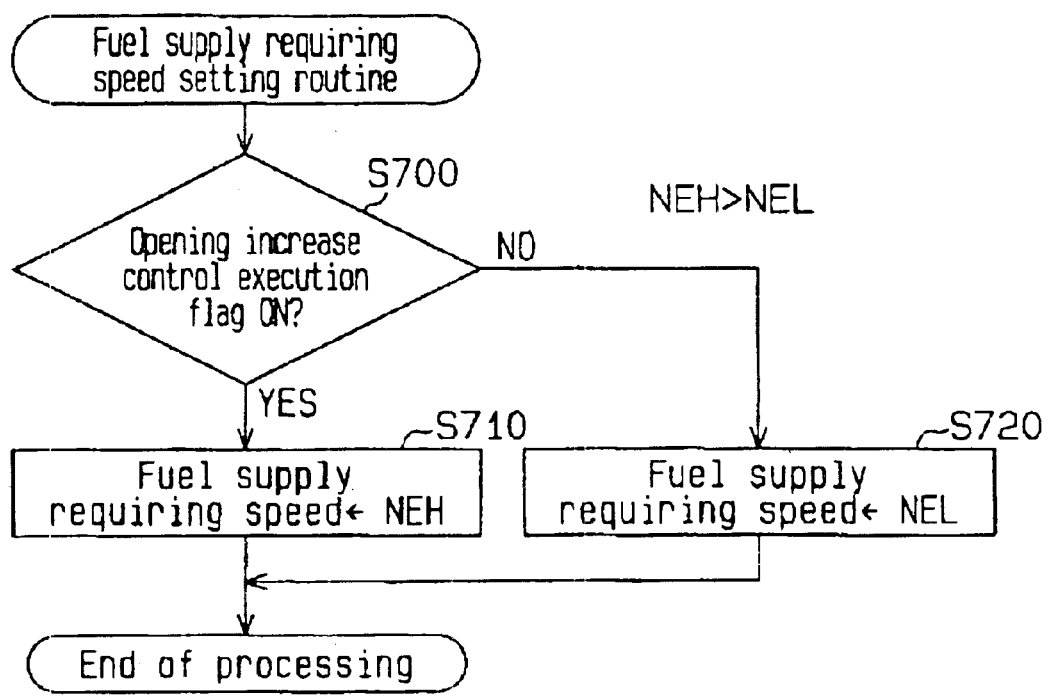
FIG. 19 is a flowchart of a routine for setting a fuel supply requiring speed in the other embodiment of the invention.

FIG. 19 further shows an example of a fuel supply requiring speed setting routine pertaining to measure (III) above. The processing of this routine is periodically executed by the ECU 25. Depending on the situation, the fuel supply requiring speed set in this routine may differ from the engine speed at which resumption of fuel supply is actually done, and strictly speaking, it means the engine speed at which control pertaining to resumption of fuel supply is started or the engine speed at which resumption of fuel supply is demanded.

When the processing of this routine is started, the ECU 25 at step S700 judges whether or not the opening increase control execution flag is on. Then the ECU 25, if the opening increase control execution flag is off, i.e. if the throttle opening increase control is not being executed, proceeds to step S720, and sets a prescribed value NEL as the fuel supply requiring speed. On the other hand, if the opening increase control execution flag is on, the ECU 25 proceeds to step S710, and sets a prescribed value NEH, higher than the value NEL, as the fuel supply requiring speed. In this way, after setting the fuel supply requiring speed according to whether or not the throttle opening increase control is being executed, the ECU 25 temporarily ends the processing of this routine.

Therefore, in the processing of this routine, during the execution of the throttle opening increase control, resumption of fuel supply is demanded at a higher engine speed NE than otherwise. As a result, while securing a sufficiently long duration of fuel cutoff when the return control is not executed, the return control is started at a sufficiently high engine speed NE to appropriately avert the engine stalling.

The embodiments of the invention described may as well be executed with the following modifications.

In the return control in the first and second embodiments, resumption of fuel supply is put on hold for the prescribed length of time T1 or T2 from the start of the return control. However, fuel supply may be resumed at the same time as the start of the return control if the delay in response ensuing from the operation of the variable lift mechanism 50 is negligible.

In the first embodiment, the target lift tVL of the intake valve 21 is set upon start of the return control to the minimum lift VLMIN, which is the lower limit of its variable range. However, the target lift tVL may be altered as appropriate according to the configuration of the applicable internal combustion engine 10 or other factors. That is, the target lift tVL may have any value as long as the valve lift of the intake valve 21 is reduced sufficiently to enable the intake air flow rate of the internal combustion engine 10 so that any excessive drive power unintended by the driver is prevented from generation after the resumption of fuel supply.

In each of the embodiments described above, the target lift tVL of the intake valve 21 after the resumption of fuel supply is so set that, when the return control is executed by the driver's action to depress the acceleration pedal during the throttle opening increase control, the air quantity let into the combustion chamber 13 increase at a fixed rate. This setting of the target lift tVL may be altered as appropriate unless the alteration invites an abrupt variation in the intake air flow rate (torque) of the internal combustion engine 10. The same applies to the setting of the target lift tVL after the resumption of fuel supply when, during the throttle opening increase control, the engine speed NE drops to or below the fuel supply requiring speed and the return control is executed.

The requirements for the execution of the fuel cutoff control and those for resumption of fuel supply are not limited to the examples described above, but may be modified as appropriate. The requirements for the execution of the throttle opening increase control may also be modified as appropriate.

The fuel supply requiring speed setting routine of FIG. 19 may be modified to a routine in which a fuel supply requiring speed is set for the vehicle speed SPD.

The configuration of the variable lift mechanism 50 is not limited to the examples shown with reference to the embodiments described above, but may be modified as appropriate. That is, as long as the invention is applied to a vehicle-mounted internal combustion engine equipped with a mechanism to make the valve lift of the intake valve 21 variable, the generation of drive power unintended by the driver immediately after resumption of fuel supply as described above is readily suppressed.

Therefore, the present examples and embodiments are to be considered as illustrative and not restrictive and the invention is not to be limited to the details given herein, but may be modified within the scope and equivalence of the appended claims.

What is claimed is:

1. A control apparatus for a vehicle-mounted internal combustion engine, the engine having a variable lift mechanism for varying the valve lift of an intake valve, wherein, during deceleration of the vehicle, the control apparatus performs fuel cutoff control for temporarily stopping supply of fuel to the engine, and during the fuel cutoff control, the control apparatus performs throttle opening increase control as necessary to set the opening degree of a throttle valve greater than a usual target opening degree that is set when an acceleration pedal is not depressed,
wherein, if the throttle opening increase control is being performed when resumption of the fuel supply is required during the fuel cutoff control, the control apparatus controls the variable lift mechanism such that the valve lift is reduced compared to a situation where the throttle opening increase control is not being performed.

2. The control apparatus according to claim 1, wherein, on condition that a speed of the engine is no less than a predetermined value when resumption of the fuel supply is required, the control apparatus permits the variable lift mechanism to reduce the valve lift.

3. The control apparatus according to claim 1, wherein, on condition that a speed of the vehicle is no less than a predetermined value when resumption of the fuel supply is required, the control apparatus permits the variable lift mechanism to reduce the valve lift.

4. The control apparatus according to claim 1, wherein, when the engine speed falls below a predetermined fuel supply requiring speed during the fuel cutoff control, resumption of the fuel supply is required, and when the throttle opening increase control is being performed, the control apparatus sets the fuel supply requiring speed higher than that in a situation where the throttle opening increase control is not performed.

5. The control apparatus according to claim 1, wherein, when the vehicle speed falls below a predetermined fuel supply requiring speed during the fuel cutoff control, resumption of the fuel supply is required, and when the throttle opening increase control is being performed, the control apparatus sets the fuel supply requiring speed higher than that in a situation where the throttle opening increase control is not performed.

6. The control apparatus according to claim 1, wherein the control apparatus suspends resumption of the fuel supply until the valve lift is reduced to or below a predetermined value.

7. The control apparatus according to claim 6, wherein, based on the rate of deceleration of the vehicle before resumption of the fuel supply is required, the control apparatus predicts at least one of a vehicle speed when the suspension of resumption of the fuel supply is removed and an amount of drop of the vehicle speed during the suspension of resumption of the fuel supply, and wherein, based on the result of the prediction, the control apparatus sets a time at which the variable lift mechanism starts reducing the valve lift such that the suspension of resumption of the fuel supply is removed at a predetermined vehicle speed.

8. The control apparatus according to claim 6, wherein, based on the rate of deceleration of the engine speed before resumption of the fuel supply is required, the control apparatus predicts at least one of an engine speed when the suspension of resumption of the fuel supply is removed and an amount of drop of the engine speed during the suspension of resumption of the fuel supply, and wherein, based on the result of the prediction, the control apparatus sets a time at which the variable lift mechanism starts reducing the valve lift such that the suspension of resumption of the fuel supply is removed at a predetermined engine speed.

9. The control apparatus according to claim 1, wherein the control apparatus performs retardation control of ignition timing until the valve lift is reduced to or below a predetermined value.

10. A control method for a vehicle-mounted internal combustion engine, the engine having a variable lift mechanism for varying the valve lift of an intake valve, the method comprising:

during deceleration of the vehicle, performing fuel cutoff control for temporarily stopping supply of fuel to the engine;

during the fuel cutoff control, performing throttle opening increase control as necessary to set the opening degree of a throttle valve greater than a usual target opening degree that is set when an acceleration pedal is not depressed; and if the throttle opening increase control is being performed when resumption of the fuel supply is required during the fuel cutoff control, controlling the variable lift mechanism such that the valve lift is reduced compared to a situation where the throttle opening increase control is not being performed.

11. The control method according to claim 10, further comprising permitting the variable lift mechanism to reduce the valve lift on condition that a speed of the engine is no less than a predetermined value when resumption of the fuel supply is required.

12. The control method according to claim 10, further comprising permitting the variable lift mechanism to reduce the valve lift on condition that a speed of the vehicle is no less than a predetermined value when resumption of the fuel supply is required.

13. The control method according to claim 10, further comprising:

requiring resumption of the fuel supply, when the engine speed falls below a predetermined fuel supply requiring speed during the fuel cutoff control; and setting the fuel supply requiring speed higher than that in a situation where the throttle opening increase control is not performed, when the throttle opening increase control is being performed.

14. The control method according to claim 10, further comprising:

requiring resumption of the fuel supply, when the vehicle speed falls below a predetermined fuel supply requiring speed during the fuel cutoff control; and setting the fuel supply requiring speed higher than that in a situation where the throttle opening increase control is not performed, when the throttle opening increase control is being performed.

15. The control method according to claim 10, further comprising suspending resumption of the fuel supply until the valve lift is reduced to or below a predetermined value.

16. The control method according to claim 15, further comprising:

predicting at least one of a vehicle speed when the suspension of resumption of the fuel supply is removed and an amount of drop of the vehicle speed during the suspension of resumption of the fuel supply, based on the rate of deceleration of the vehicle before resumption of the fuel supply is required; and setting a time at which the variable lift mechanism starts reducing the valve lift based on the result of the prediction such that the suspension of resumption of the fuel supply is removed at a predetermined vehicle speed.

17. The control method according to claim 15, further comprising:

predicting at least one of an engine speed when the suspension of resumption of the fuel supply is removed and an amount of drop of the engine speed during the suspension of resumption of the fuel supply, based on the rate of deceleration of the engine speed before resumption of the fuel supply is required; and setting a time at which the variable lift mechanism starts reducing the valve lift based on the result of the prediction such that the suspension of resumption of the fuel supply is removed at a predetermined engine speed.

18. The control method according to claim 10, further comprising performing retardation control of ignition timing until the valve lift is reduced to or below a predetermined value.

* * * * *